(12) United States Patent
Ozoka et al.

(10) Patent No.: US 10,817,804 B1
(45) Date of Patent: Oct. 27, 2020

(54) USING MACHINE LEARNING TO PREDICT USER PROFILE AFFINITY BASED ON BEHAVIORAL DATA ANALYTICS

(71) Applicant: Capital One Services, LLC, McLean, VA (US)

(72) Inventors: Noble Ozoka, Richmond, VA (US); Matthew Reedy, Richmond, VA (US); Andrew Marr, Midlothian, VA (US); Lin Ward, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/405,831

(22) Filed: May 7, 2019

(51) Int. Cl.
*G06N 20/00* (2019.01)
*G06N 5/04* (2006.01)
*G06Q 40/02* (2012.01)
*G06F 30/20* (2020.01)
*G06Q 50/00* (2012.01)

(52) U.S. Cl.
CPC ............ *G06N 20/00* (2019.01); *G06F 30/20* (2020.01); *G06N 5/048* (2013.01); *G06Q 40/02* (2013.01); *G06Q 50/01* (2013.01)

(58) Field of Classification Search
CPC ..................................................... G06N 5/048
USPC ......................................................... 706/11
See application file for complete search history.

(56) References Cited

U.S. PATENT DOCUMENTS

| | | | | |
|---|---|---|---|---|
| 6,735,568 B1 * | 5/2004 | Buckwalter | ............ | G06Q 30/02 705/319 |
| 7,885,902 B1 * | 2/2011 | Shoemaker | ............ | G06Q 10/10 705/1.1 |
| 9,069,945 B2 * | 6/2015 | Singh | ...................... | G06F 21/40 |
| 9,679,259 B1 * | 6/2017 | Frind | ...................... | G06N 20/00 |
| 9,870,465 B1 * | 1/2018 | Levi | ...................... | H04L 67/306 |
| 2009/0164464 A1 * | 6/2009 | Carrico | .................. | G06Q 10/10 |
| 2009/0248685 A1 * | 10/2009 | Pasqualoni | ......... | G06F 16/9535 |
| 2011/0106610 A1 | 5/2011 | Landis et al. | | |

(Continued)

OTHER PUBLICATIONS

Joel, S., Eastwick, P. W., & Finkel, E. J. (2017). Is Romantic Desire Predictable? Machine Learning Applied to Initial Romantic Attraction. Psychological Science, 28(10), 1478-1489. https://doi.org/10.1177/0956797617714580 (Year: 2017).*

Tay et al. "CoupleNet: Paying Attention to Couples with Coupled Attention for Relationship Recommendation" May 2018, obtained online on Aug. 29, 2019 at <arxiv.org/abs/1805.11535?> (Year: 2018).*

Cao et al., "Behavior Informatics: An Informatics Perspective for Behavior Studies", Research Gate, Jan. 2009, 7 pages.

(Continued)

*Primary Examiner* — James D. Rutten
(74) *Attorney, Agent, or Firm* — Harrity & Harrity, LLP

(57) ABSTRACT

A behavioral analytics platform may obtain a first data set associated with a first user and a second data set associated with a second user. The behavioral analytics platform may determine a first set of behavioral categories to classify the historical user activity data associated with the first user based on a first set of behavior vectors and determine a second set of behavioral categories to classify the historical user activity data associated with the second user based on a second set of behavior vectors. The behavioral analytics platform may populate one or more user interfaces that are accessible to the first user and/or the second user based on one or more values representing a degree to which the first set of behavioral categories and the second set of behavioral categories correspond to complementary behavioral tendencies, which may be determined using a machine learning technique.

20 Claims, 8 Drawing Sheets

(56) References Cited

U.S. PATENT DOCUMENTS

| | | | | |
|---|---|---|---|---|
| 2011/0107260 A1* | 5/2011 | Park | ............... | G06Q 10/04 |
| | | | | 715/811 |
| 2013/0282745 A1* | 10/2013 | Mishra | ............... | G06Q 30/00 |
| | | | | 707/758 |
| 2014/0156750 A1* | 6/2014 | De Cristofaro | .... | G06Q 10/1095 |
| | | | | 709/204 |
| 2015/0356451 A1* | 12/2015 | Gupta | ............... | G06N 20/00 |
| | | | | 706/52 |
| 2016/0078358 A1* | 3/2016 | Baveja | ............... | G06F 16/24578 |
| | | | | 706/52 |
| 2017/0060933 A1 | 3/2017 | Feldman | | |
| 2018/0260727 A1* | 9/2018 | Blanco | ............... | G06Q 30/02 |
| 2019/0147366 A1* | 5/2019 | Sankaran | ............... | G06N 20/00 |
| 2020/0027050 A1* | 1/2020 | Ghosh | ............... | G09B 5/12 |

OTHER PUBLICATIONS

Cao, "In-depth behavior understanding and use: The behavior informatics approach", Apr. 10, 2010, 19 pages.

Joel et al., "Is Romantic Desire Predictable? Machine Learning Applied to Initial Romantic Attraction", 2017, pp. 1-17.

Finkel et al., "Online Dating: A Critical Analysis From the Perspective of Psychological Science", Psychological Science in the Public Interest, 2012, 64 pages.

Parry, "The Association Between Shared Values and Wellbeing Among Married Couples", 2016, 131 pages.

https://www.millionairematch.com, "The Original & Largest Millionaire Dating Platform Since 2001", 2001, 2 pages.

\* cited by examiner

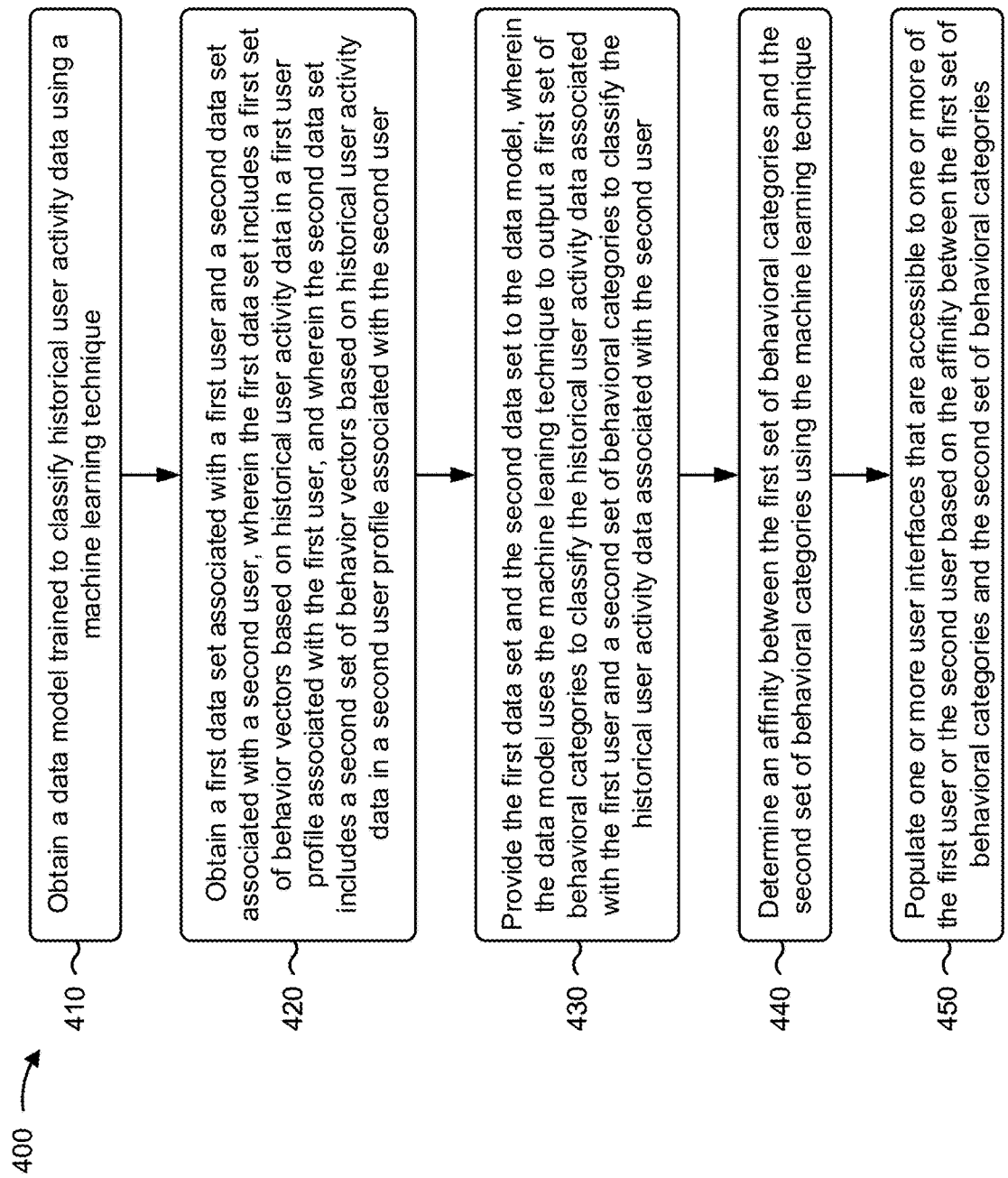

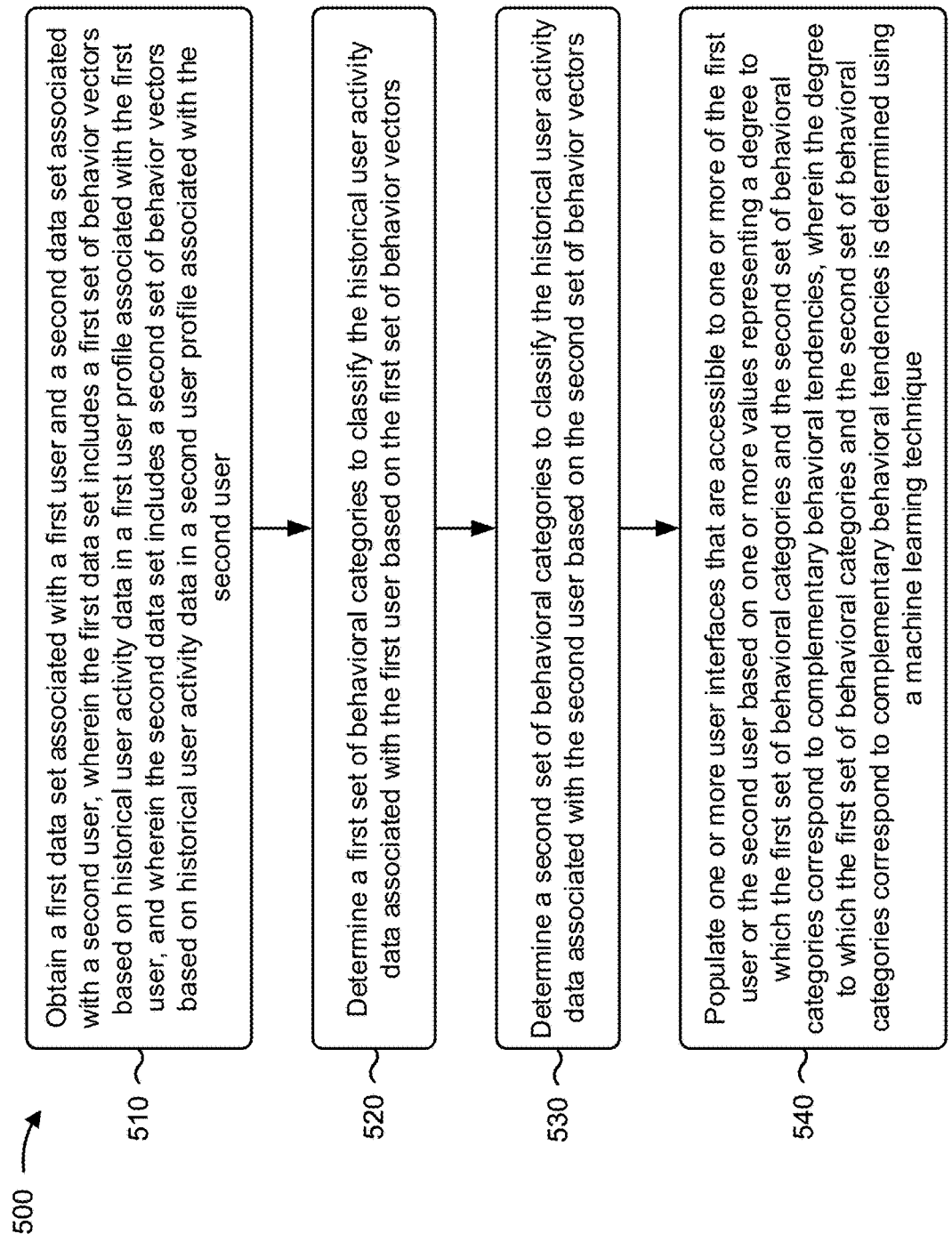

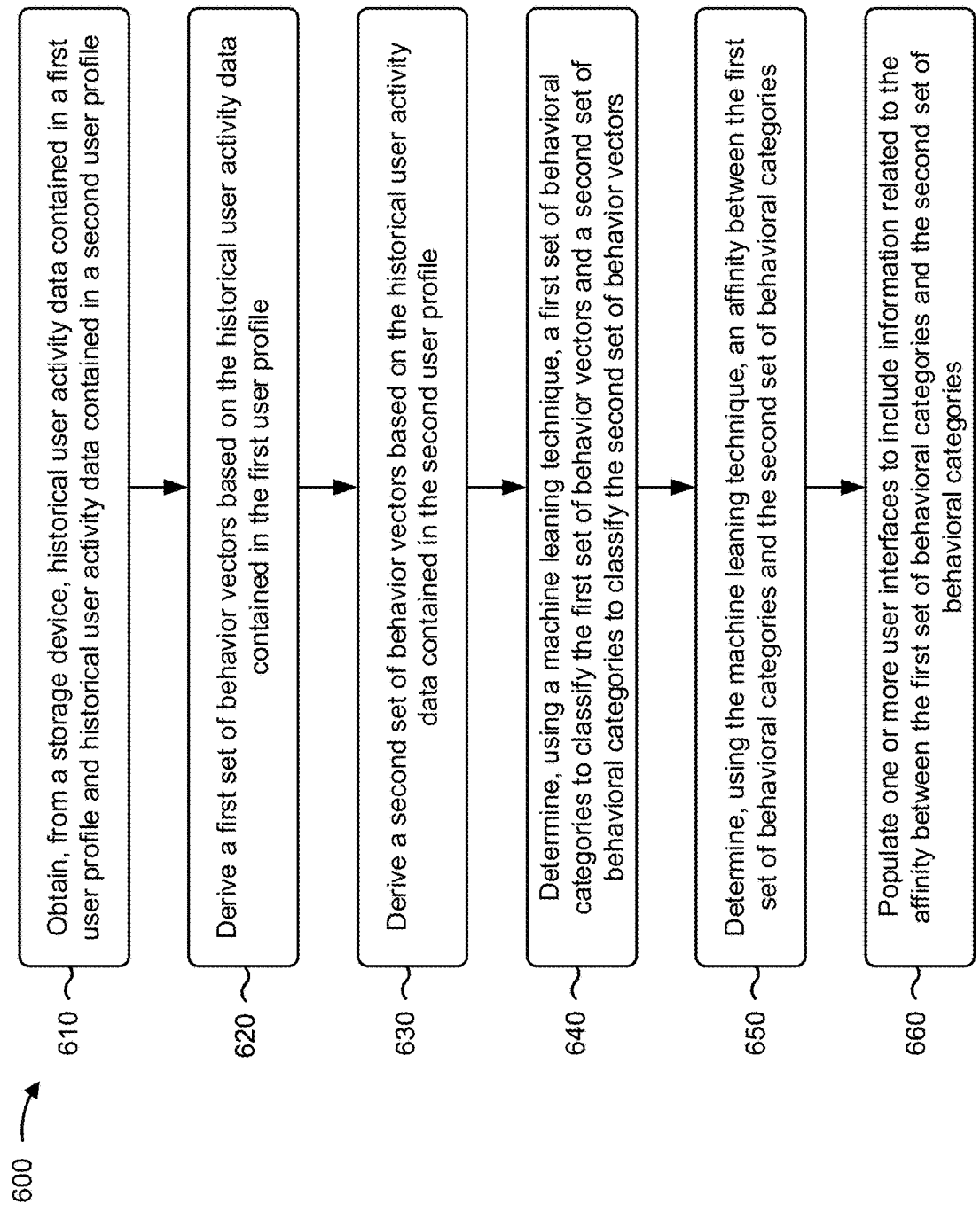

USING MACHINE LEARNING TO PREDICT USER PROFILE AFFINITY BASED ON BEHAVIORAL DATA ANALYTICS

BACKGROUND

Informatics generally refers to a branch of information engineering that considers interactions between humans and information in the construction and design of interfaces, technologies, systems, and/or the like. In particular, individuals and organizations increasingly process information digitally, which has led to the study of informatics with computational, mathematical, biological, cognitive, and social aspects. For example, informatics may be applied to obtain behavior informatics, which may refer to intelligence and insights based on behavioral data derived from web usage, vehicle movements, transactional data, and/or the like. Accordingly, behavior informatics may be used to build computational theories, systems, and tools to model, represent, analyze, and manage behaviors of individuals, groups, and/or the like.

SUMMARY

According to some implementations, a method may include obtaining a data model trained to classify historical user activity data using a machine learning technique; obtaining a first data set associated with a first user and a second data set associated with a second user, wherein the first data set includes a first set of behavior vectors based on historical user activity data in a first user profile associated with the first user, and wherein the second data set includes a second set of behavior vectors based on historical user activity data in a second user profile associated with the second user; providing the first data set and the second data set to the data model, wherein the data model uses the machine learning technique to output: a first set of behavioral categories to classify the historical user activity data associated with the first user, and a second set of behavioral categories to classify the historical user activity data associated with the second user; determining an affinity between the first set of behavioral categories and the second set of behavioral categories using the machine learning technique; and populating one or more user interfaces that are accessible to one or more of the first user or the second user based on the affinity between the first set of behavioral categories and the second set of behavioral categories.

According to some implementations, a device may include one or more memories, and one or more processors, communicatively coupled to the one or more memories, configured to: obtain a first data set associated with a first user and a second data set associated with a second user, wherein the first data set includes a first set of behavior vectors based on historical user activity data in a first user profile associated with the first user, and wherein the second data set includes a second set of behavior vectors based on historical user activity data in a second user profile associated with the second user; determine a first set of behavioral categories to classify the historical user activity data associated with the first user based on the first set of behavior vectors; determine a second set of behavioral categories to classify the historical user activity data associated with the second user based on the second set of behavior vectors; and populate one or more user interfaces that are accessible to one or more of the first user or the second user based on one or more values representing a degree to which the first set of behavioral categories and the second set of behavioral categories correspond to complementary behavioral tendencies, wherein the degree to which the first set of behavioral categories and the second set of behavioral categories correspond to complementary behavioral tendencies is determined using a machine learning technique.

According to some implementations, a non-transitory computer-readable medium may store one or more instructions. The one or more instructions, when executed by one or more processors, may cause the one or more processors to: obtain, from a storage device, historical user activity data contained in a first user profile and historical user activity data contained in a second user profile; derive a first set of behavior vectors based on the historical user activity data contained in the first user profile; derive a second set of behavior vectors based on the historical user activity data contained in the second user profile; determine, using a machine learning technique, a first set of behavioral categories to classify the first set of behavior vectors and a second set of behavioral categories to classify the second set of behavior vectors; determine, using the machine learning technique, an affinity between the first set of behavioral categories and the second set of behavioral categories; and populate one or more user interfaces to include information related to the affinity between the first set of behavioral categories and the second set of behavioral categories.

BRIEF DESCRIPTION OF THE DRAWINGS

FIGS. 4-6 are flow charts of example processes for predicting user profile affinity based on behavioral data analytics.

DETAILED DESCRIPTION

Figure 1A:
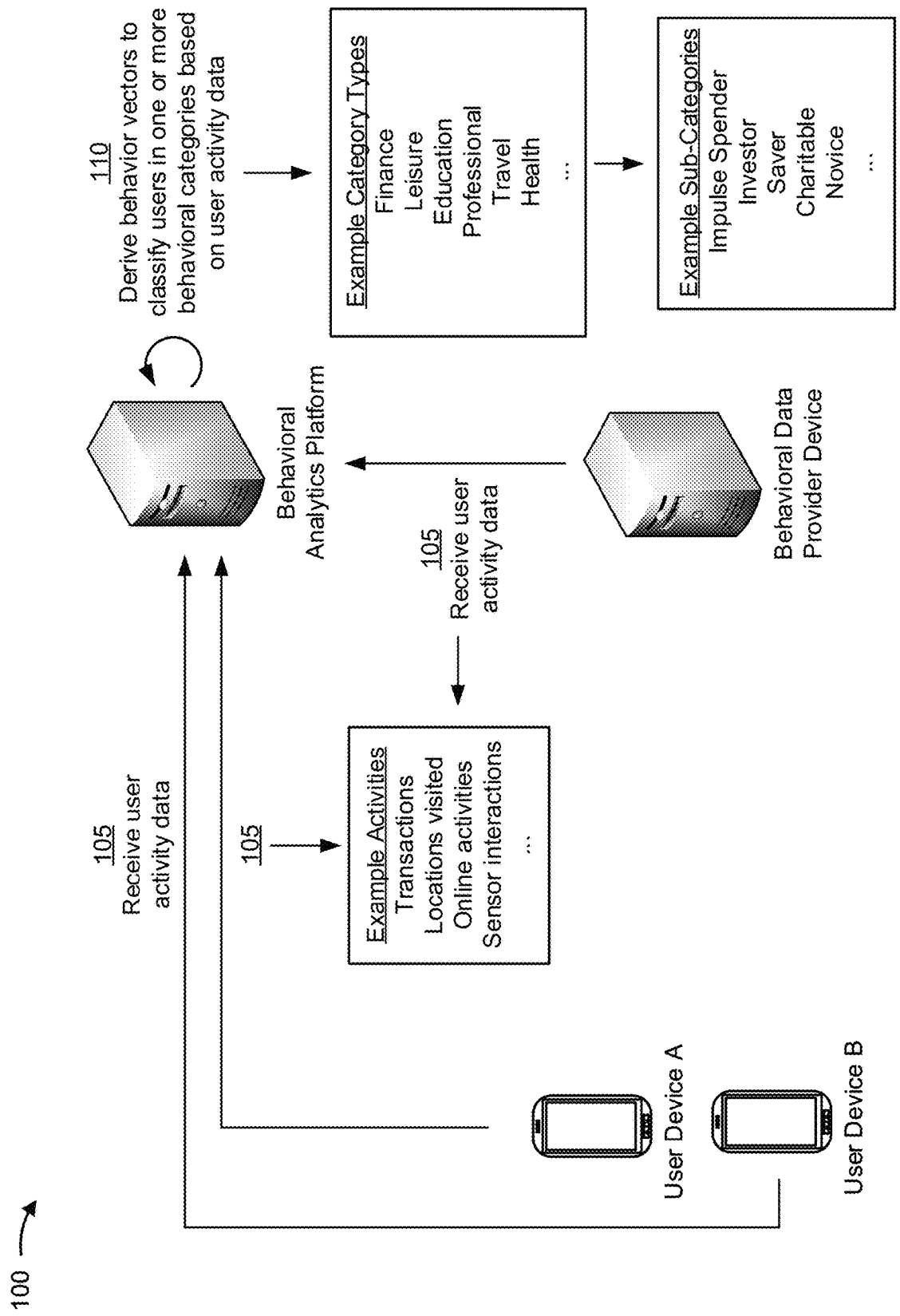
FIGS. 1A-1C are diagrams of one or more example implementations described herein.

The following detailed description of example implementations refers to the accompanying drawings. The same reference numbers in different drawings may identify the same or similar elements.

The challenges of dating to find a suitable partner has created a market for online dating (or Internet dating) services that provide certain mechanisms (e.g., websites, mobile applications, and/or the like) to enable people to make new personal connections, usually with a goal to develop a personal relationship, a romantic relationship, and/or the like. For example, when registering for an online dating service, a user typically creates a profile and provides personal information to the online dating service (e.g., age, gender, sexual orientation, location, appearance, hobbies, and/or the like). In some cases, the user may also complete a questionnaire designed to assess psychological constructs that tend to vary from one individual to another (e.g., values, personality, preferences that relate to desired qualities in a partner, and/or the like). The online dating service may then identify potential matches for the user by inputting the personal information in the profile, responses to the questionnaire, and/or the like into an algorithm.

Although different online dating services may utilize different (often proprietary) matching algorithms, a common thread is a purported capability to provide users with tailored romantic matches. One assumption underlying this purported capability is that compatibility can be assessed using self-reported personal preferences, questionnaire responses, and/or the like. However, various psychological factors cast doubt on the validity of this assumption. For example, some people may lack accurate self-awareness, which could result in a variance between qualities that a particular person finds attractive and self-reported preferences regarding desired qualities in a potential partner. In another example, psychological dissonance may lead to certain people engaging in strategic self-presentation to craft profiles that potential partners may find to be favorable. In other words, whether intentionally or unintentionally, some people may provide inaccurate or misleading details when responding to questionnaires, expressing personal traits, and/or the like. Even if a particular person is self-aware and immune to psychological dissonance, there is no guarantee that other users matched to the particular person will have the same ability to provide perfectly truthful and accurate information. Accordingly, when matching algorithms are used to find potential matches for a particular user based on self-reported personal details, questionnaire responses, and/or the like, various psychological factors may taint the data points that are input to the matching algorithm, which may lead to inaccurate or misleading matches regardless of the logic configured into the matching algorithm.

Furthermore, to the extent that certain online dating services may utilize other data points that are not self-reported as inputs to a matching algorithm, such data points tend to be fairly limited and do not provide comprehensive insight into user personalities, backgrounds, interests, values, preferred characteristics in a partner, and/or the like. For example, some online dating services may collect data that relates to how long a user takes to respond to a message about a match, how often the user logs in to check for matches, search criteria that the user provides when attempting to find and self-select potential matches, characteristics that are shared among people that the user contacts, and/or the like. Accordingly, while some online dating services may consider behavioral variables data points that are not self-reported, the available data points tend to have a limited scope (e.g., direct interactions with the online dating service).

The above-mentioned drawbacks and limitations associated with existing online dating services may lead to inefficiency and substantial wasted computing resources (e.g., processor resources, memory resources, communication resources, and/or the like). For example, in order to use a matching algorithm to produce matches based on responses to a questionnaire, which can often include a large number of questions (e.g., several hundred questions), substantial computing resources may be consumed by, for example, a user accessing the online dating service, presenting questions to the user, receiving and processing responses to the questions, inputting the responses to the matching algorithm, and/or the like. Furthermore, when users are presented with matches that do not result in a successful relationship, additional computing resources are consumed each time that the matching algorithm is executed to find new matches, the online dating service communicates the matches to the user, the online dating service facilitates communication between potential matches (e.g., via a direct messaging service that online dating services often provide), and/or the like. When matching algorithms depend on self-reported personal details, preferences, and/or the like, a probability that one or more matches will not succeed may increase because dissonance, strategic self-presentation, and/or other psychological factors may result in the matching algorithm(s) receiving inaccurate input data, thus wasting computing resources.

Some implementations described herein may use one or more artificial intelligence techniques (e.g., machine learning, deep learning, and/or the like) to predict an affinity between a pair of user profiles based on behavioral data analytics derived from various sources of user activity data. For example, transactional data related to user activities may be generated whenever a person engages in online activity, carries a location-enabled smartphone while going about their day, travels in a connected vehicle, and/or otherwise engages in an activity that involves a digital action, leaves a digital footprint, and/or the like. Moreover, with the increasing prevalence of technologies such as machine-to-machine (M2M) communications, the Internet of Things (IoT), and/or the like, data relating to user activities may be generated whenever "smart" machines communicate with one another, whether in the home, at the workplace, in a vehicle, in industrial settings, and/or the like. Accordingly, some implementations described herein may define one or more data structures for representing user behaviors based on transactional data contained in electronic records from various sources, which can be used to derive information relating to user personalities, backgrounds, interests, values, preferred characteristics in a partner, and/or the like. Because the transactional data is based on actual user activities (e.g., computer-to-human interactions, human-to-human interactions, and/or the like), the user behaviors represented in the one or more data structures are likely to be more accurate than self-reported data.

For example, as described in further detail elsewhere herein, a behavioral analytics platform may obtain one or more data models that have been trained to classify historical user activity data using one or more machine learning techniques. The behavioral analytics platform may obtain data sets that relate to user activities (e.g., behavior vectors that are based on historical user activity data in a user profile), and the data sets (e.g., the behavior vectors or data based on the behavior vectors) may be input to the one or more data models to determine one or more behavioral categories, sub-categories, and/or the like for a particular user. The behavioral analytics platform may identify one or more matches for the particular user based on affinities between the behavioral categories, sub-categories, and/or the like associated with the particular user and behavioral categories, sub-categories, and/or the like in which other users are classified. In this way, by identifying potential matches based on behavioral data that is derived from actual user activities, which may be evaluated alone or in combination with self-reported data, implementations described herein may produce matches that are more likely to succeed. This may conserve computing resources (e.g., memory resources, processor resources, communication resources, and/or the like) that would otherwise be consumed by a user logging into an online dating service to search for new matches, executing a matching algorithm to find new matches, and/or the like.

In some implementations, as described elsewhere herein, the electronic records used to derive the behavioral data may include transactional data associated with one or more users. For example, the behavioral analytics platform may interface with or otherwise be associated with one or more financial institutions where users hold one or more accounts (e.g., checking accounts, credit card accounts, investment accounts, installment accounts, and/or the like). Accordingly, the behavioral analytics platform may have access to user transactional data that may include data related to historical financial behaviors (e.g., spending patterns, savings patterns, investment patterns, debt repayment patterns, and/or the like). Furthermore, in some cases, the transactional data may include fine-grained details that can be used to model user behavioral tendencies (e.g., books that a user purchases may indicate personal interests, locations where users engage in transactions may indicate certain lifestyle characteristics, and/or the like). For example, the transactional data may include locations where the transactions occurred, times when the transactions occurred, contexts associated with the transaction, and/or the like.

In this way, by evaluating financial behaviors as one or more factors used to determine whether a particular pair of users is a potential match, implementations described herein may produce relevant matches where pairs of users are determined to have similar, complementary, or otherwise compatible financial behaviors. In this way, because finances are often a significant factor in whether a relationship succeeds or fails, or the happiness and/or well-being of people in a relationship, implementations described herein may produce potential matches among people that share core financial values, which may lead to more efficient and accurate matches. Furthermore, because the behavioral analytics platform interfaces with or is otherwise associated with the financial institution(s) where users may hold accounts, the behavioral analytics platform may ingest the transactional data with minimal communication, processing, and/or other overhead, may reduce or eliminate bias, dissonance, and/or other factors that may undermine accuracy of self-reported data, and/or the like.

Figure 1B:
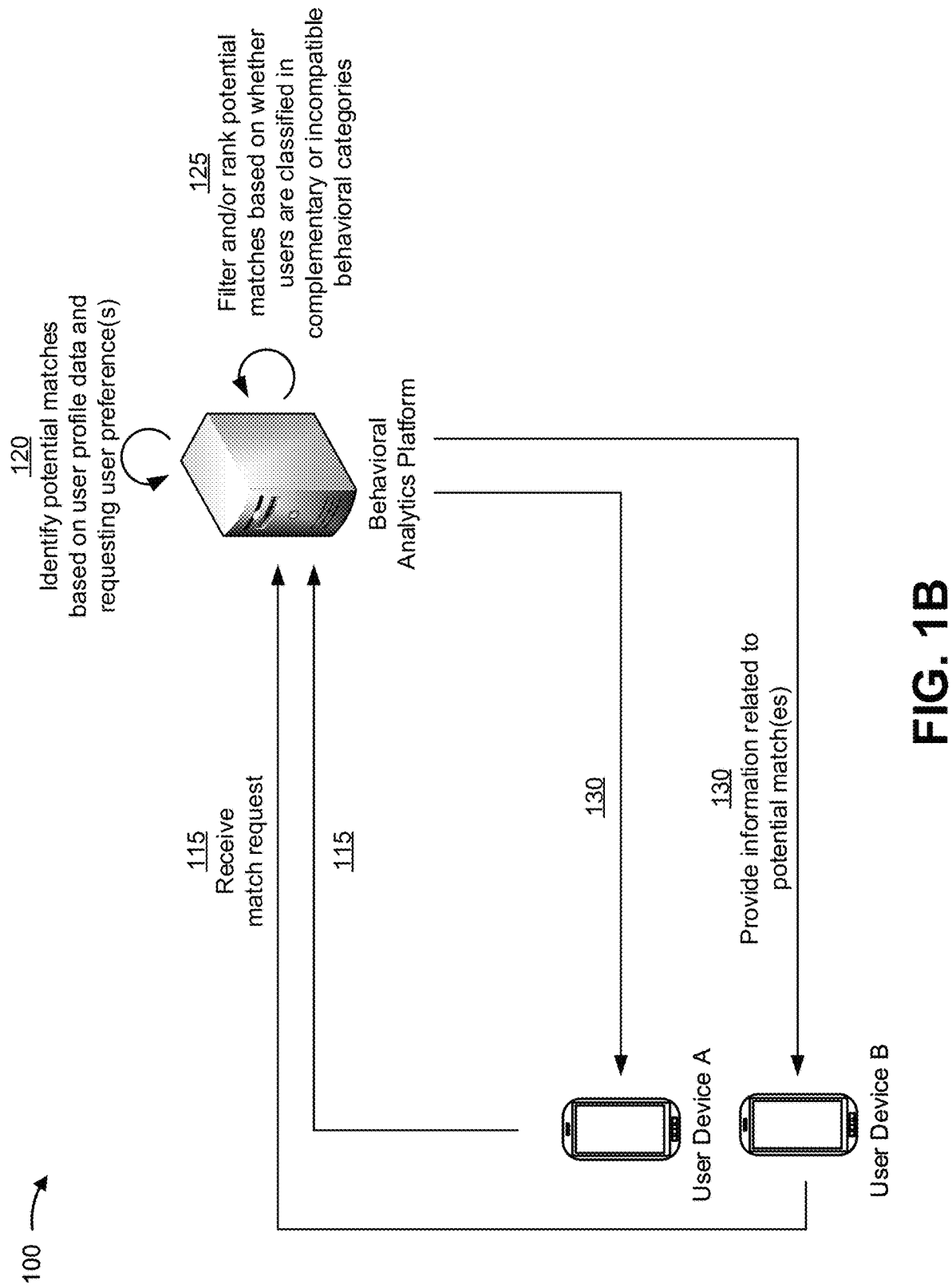
Figure 1C:
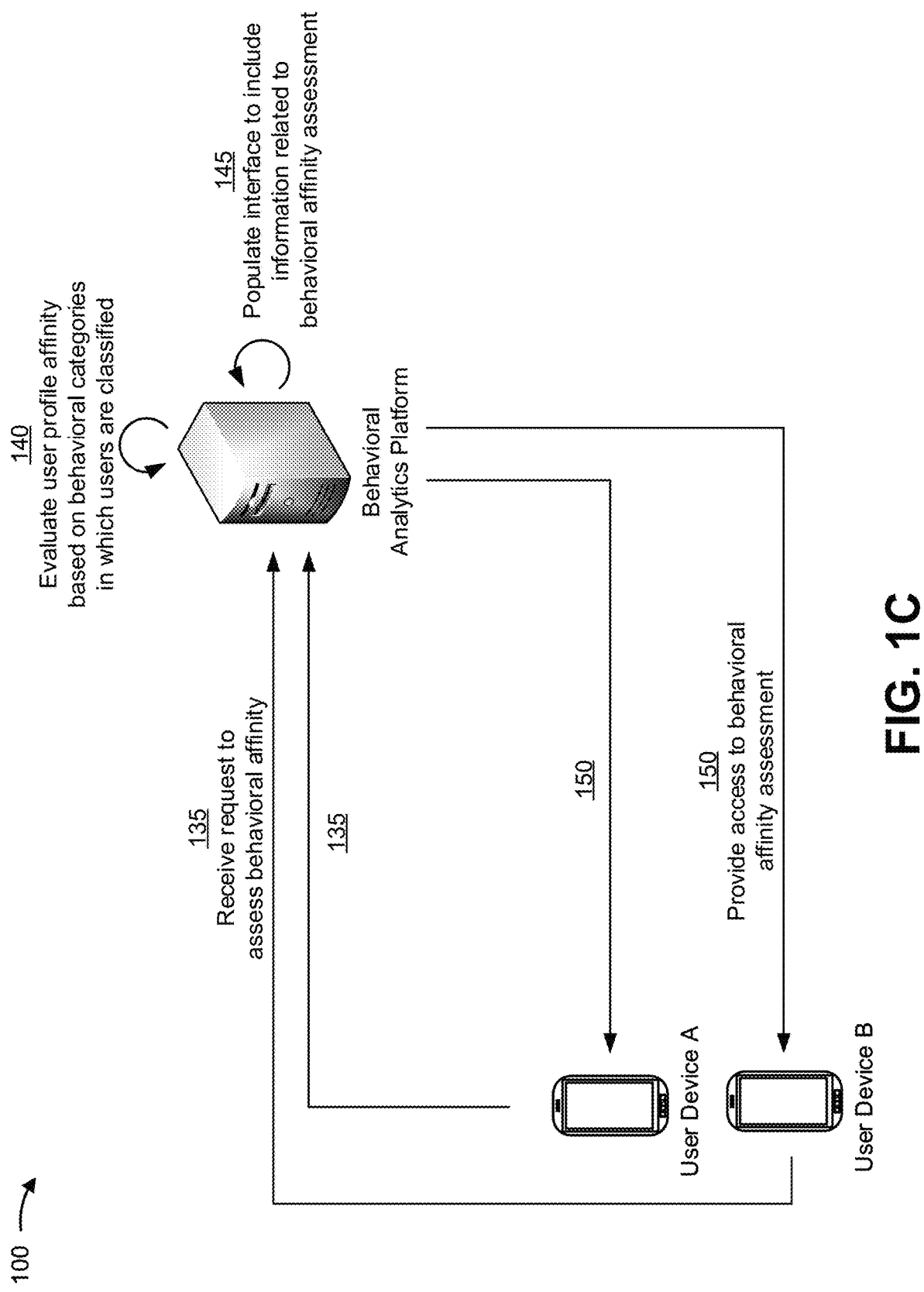

FIGS. 1A-1C are diagrams of one or more example implementations 100 described herein. As will be described in further detail herein, example implementation(s) 100 can include one or more user devices that are associated with respective users, a behavioral data provider device that can detect and/or report data relating to activities of the users associated with the one or more user devices, and a behavioral analytics platform that may classify the users into one or more behavioral categories based on the data related to the activities of the users and determine an affinity between a particular pair of users (e.g., a likelihood that the pair of users are potentially compatible) based on the behavioral categories in which the users are classified.

As shown in FIG. 1A, the behavioral analytics platform may receive user activity data from the one or more user devices and/or the behavioral data provider device and classify users associated with the user devices into one or more behavioral categories based on the user activity data. As shown in FIG. 1B, the behavioral analytics platform may identify potential matches for a user of a particular user device (e.g., potential romantic partners selected by a suitable algorithm, such as a machine learning algorithm), and filter or rank the potential matches based on whether the behavioral categories in which the potential matches are classified are similar, dissimilar, compatible, incompatible, complementary, and/or the like with respect to the user that requested the potential matches. As shown in FIG. 1C, the behavioral analytics platform may additionally, or alternatively, be used to facilitate counseling, therapy, information sharing, and/or the like based on the user activity data by evaluating affinities among user profiles based on behavioral categories associated with the user profiles and populating one or more user interfaces to include information relating to behavioral affinities among the user profiles.

In some implementations, the behavioral analytics platform may enable a user (e.g., a user associated with a particular user device) to register for a service based on behavioral analytics (e.g., an online dating service, a financial counseling service, a relationship counseling service, and/or the like) using the user device. For example, the user device may connect to the behavioral analytics platform via a wired and/or wireless connection, create a user account, and register for the behavioral analytics service. In some implementations, the behavioral analytics platform may enable the user to establish a user profile (e.g., providing certain self-reported personal details, preferences, questionnaire responses, and/or the like), which may be validated, augmented, or otherwise processed in connection with user activity data related to one or more transactions performed by the user, as described in further detail elsewhere herein.

In some implementations, the behavioral analytics platform may also enable the user to link one or more other data sources to the established user profile (e.g., other sources of transactional data, such as sensors in the user's home, a connected vehicle in which the user frequently travels, financial institutions where the user holds one or more accounts, social media platforms where the user has one or more accounts, and/or the like). In some implementations, the behavioral analytics service may be provided to the user via a client application installed on the user device, via a web-based application hosted by the behavioral analytics platform, and/or the like. Using the behavioral analytics service, the user may specify the user activity data to be shared with the behavioral analytics platform. For example, the user may indicate that certain user activities are to be concealed or otherwise kept private (e.g., the user may not want to share location data with the behavioral analytics platform) and indicate other user activities that are to be shared with the behavioral analytics platform.

As shown in FIG. 1A, and by reference number 105, the behavioral analytics platform may receive user activity data from various sources, which may include one or more user devices, a behavioral data provider device (e.g., a device that can provide transactional user activity data, such as a device associated with a financial institution where a user holds one or more accounts), and/or the like.

In some implementations, the user device(s) may be associated with a specific user and provide various types of activity data to the behavioral analytics platform. For example, the user activity data may relate to one or more transactions that the user has performed, which may include financial transactions (e.g., bank deposits, bill payments, loan or debt repayments, investment activity, savings activity, spending at brick-and-mortar establishments such as a restaurant or commercial establishment, online spending, and/or the like). Additionally, or alternatively, the transactions may include one or more human-to-human or interpersonal interactions (e.g., social interactions with friends or acquaintances, professional interactions between colleagues, educational interactions between teachers and students, and/or the like), which may be detected based on certain events (e.g., detecting a device associated with another user in proximity to the user device, identifying a calendar entry that describes a scheduled interpersonal interaction, and/or the like). Additionally, or alternatively, the transactions may include one or more human-to-machine or machine-to-machine interactions (e.g., activities that the user performs using the user device, interactions between the user device and another device, and/or the like). In this way, the user device may provide various types of user activity data to the behavioral analytics platform (e.g., transactions performed, locations visited, online activities conducted, sensor interactions, and/or the like), and the behavioral analytics platform may analyze the user activity data to classify or otherwise learn behavioral patterns of the user.

In some implementations, as mentioned above, the behavioral data provider device may be associated with one or more financial institutions where users hold one or more accounts (e.g., checking accounts, savings accounts, investment accounts, accounts for installment loans such as vehicle loans, mortgage loans, and/or the like, credit card accounts, and/or the like). Accordingly, in some cases, the behavioral data provider device may provide further user activity data to the behavioral analytics platform based on activities that occur in the one or more accounts held by the user. For example, the user activity data may include deposit, withdrawal, payment, and/or other activity in checking accounts, savings accounts, investment accounts, and/or the like, spending activity in one or more credit card accounts, and/or the like. In some cases, the user activity data may include various details relating to the transactional data contained therein. For example, a particular transaction may be associated with one or more subjects (e.g., a payor, a payee, and/or the like), a location where the transaction occurred (e.g., a physical real-world location that may be represented by coordinates and/or other suitable location information, an online location that may be represented by a network address, and/or the like), a time when the transaction occurred, one or more objects (e.g., an entity or other construct associated with the transaction, such as an installment loan, a purchased item, and/or the like).

As further shown in FIG. 1A, and by reference number 110, the behavioral analytics platform may derive a set of behavior vectors to classify users of the user devices in one or more behavioral categories based on the user activity data. In general, a behavior vector may include various attributes associated with a particular transaction, which as noted elsewhere herein may relate to an interpersonal (e.g., human-to-human) interaction, a human-to-machine interaction, a machine-to-machine interaction, a financial transaction, and/or the like. For example, in the user activity received at the behavioral analytics platform, behavioral elements may be dispersed among various transactions that may have weak linkages, indirect linkages, and/or the like (e.g., investment activity to buy a stock, sell a stock, set up automatic contributions, withdraw funds, and/or the like may be recorded in separate transactions even though the transactions all relate to trading behaviors). Accordingly, the behavior vector may provide a data structure to explicitly represent various attributes of a transaction in a form that can be input to a computational system and thereby enable vector-oriented analysis of user behavior patterns. In other words, the behavioral analytics platform may be configured to identify behavior-oriented attributes in transactions that are included in the user activity data and map the behavior-oriented elements to a behavior-oriented feature space in which behavioral data is represented as behavior vectors or behavior sequences that include multiple related or otherwise associated behavior vectors.

For example, in some implementations, the behavior-oriented attributes identified in the transactions that are included in the user activity data may include subjects involved in the transactions, locations where the transactions occurred, times when the transactions occurred, and/or objects of the transactions. Additionally, or alternatively, the behavior-oriented attributes may include one or more transaction contexts (e.g., an environment in which the transaction occurred), one or more transaction objectives, one or more actions performed to carry out the transactions, an impact or result that a transaction has on the subject and/or object of the transaction, associations with other transactions that are related or otherwise impacted by a transaction, and/or the like. Accordingly, a behavior vector may generally be represented as a set of attributes containing one or more of the above-mentioned attributes and/or other suitable attributes that can be used to characterize a transaction. Furthermore, one or more behavior sequences can be derived based on multiple behavior vectors that relate to transactions that are related or otherwise associated with one another.

In this way, in addition to containing general attributes such as time and location, a behavior vector can include data related to social factors, organizational factors, motivations, and/or the like, which may be represented in textual form, categorical form, numeric form, and/or the like. In this way, the behavior vector data structure may represent transactional data as a behavior object that can be analyzed using computational systems, which may use one or more artificial intelligence techniques, such as machine learning, deep learning, and/or the like to classify user activity data (e.g., transactional data) into one or more behavioral categories, sub-categories, and/or the like, and to predict affinities between user profiles associated with respective pairs of users (e.g., based on the behavioral categories, sub-categories, and/or the like in which the users are classified).

For example, as shown in FIG. 1A, the behavioral analytics platform may classify users into one or more behavioral categories (e.g., finance, leisure, education, professional, travel, health, and/or the like). Furthermore, the behavioral categories may include various sub-categories into which the users may be classified. For example, as further shown in FIG. 1A, a behavioral category related to finance may include one or more sub-categories for various financial types (e.g., impulse spenders, investors, savers, charitable spenders, novices, and/or the like). In this way, the behavioral analytics platform may capture various behavioral tendencies, preferences, core values, and/or the like that different users have with regard to financial matters. For example, a user's spending habits may be evaluated to determine how the user values money and/or otherwise identify the user's financial values, which the behavioral analytics platform may use to determine an affinity between the user and other users with financial values that may be similar, dissimilar, compatible, incompatible, complementary, and/or the like (e.g., based on whether a person tends to spend money on education, books, or other things that could lead to an increase in future wealth, spend money on items that have a tendency to depreciate in value, visit certain places, and/or the like).

Accordingly, as described herein, the behavioral analytics platform may use one or more artificial intelligence techniques, such as machine learning, deep learning, and/or the like to classify user activity data (e.g., transactional data) into one or more behavioral categories, sub-categories, and/or the like and to predict affinities between user profiles associated with respective pairs of users (e.g., based on the behavioral categories, sub-categories, and/or the like into which the user activity data is classified).

In some implementations, the behavioral analytics platform may parse natural language descriptions contained in the user activity data received from the user device(s), the behavioral data provider device, and/or the like. For example, the behavioral analytics platform may obtain data identifying, in natural language, a description of a transaction (e.g., a financial transaction, a human-to-human interaction, a human-to-machine interaction), and may parse the data to identify one or more attributes associated with the transaction (e.g., a subject, an object, a location, a time, a context, an action, and/or the like).

In this way, the behavioral analytics platform may identify attributes and/or other suitable characteristics associated with user activity (e.g., transactional) data, as described herein. Based on applying a rigorous and automated process to classify user activity data and predict affinities among user profiles based on behavioral data analytics, the behavioral analytics platform enables recognition and/or identification of thousands or millions of attributes for thousands or millions or more transactions, thereby increasing an accuracy and consistency of predicted affinities among user profiles relative to requiring computing resources to be allocated for hundreds or thousands of technicians to manually identify attributes of the thousands or millions or more transactions.

In some implementations, the behavioral analytics platform may determine whether behavioral categories, sub-categories, and/or the like associated with a first user are or can be considered similar, complementary, and/or the like with respect to behavioral categories, sub-categories, and/or the like associated with a first user, as described herein. For example, the behavioral analytics platform may generate a data model based on observed user behaviors that are represented in historical user activity data (e.g., transactional data) received from the user device(s), the behavioral data provider device, and/or the like. For example, the behavioral analytics platform may train the data model using historical user activity information that includes a plurality of behavior vectors, a plurality of behavior sequences, and/or the like, to identify vector-oriented behavior patterns in the historical user activity information. As an example, the behavioral analytics platform may determine that past behaviors, behavior sequences, and/or the like, are associated with a threshold probability of being associated with a particular behavioral category, sub-category, and/or the like. In some implementations, the behavioral analytics platform may use a scoring system (e.g., with relatively high scores and/or relatively low scores) to identify and/or classify users as being associated with one or more behavioral categories, sub-categories, and/or the like. In this case, the behavioral analytics platform may determine that a relatively high score is to be assigned to a particular behavioral category, sub-category, and/or the like based on transactional data including indicators of one or more behaviors including attributes that are determined to be the same as or similar to behaviors previously identified as being associated with the particular behavioral category, sub-category, and/or the like. In contrast, the behavioral analytics platform may determine that a relatively low score is to be assigned to a particular behavioral category, sub-category, and/or the like based on transactional data including indicators of one or more behaviors including attributes that are determined to be different from or dissimilar to behaviors previously determined to be associated with the particular behavioral category, sub-category, and/or the like.

In some implementations, the behavioral analytics platform may perform a data preprocessing operation when generating the data model based on the observed user behaviors represented in the historical user activity data. For example, the behavioral analytics platform may preprocess the historical user activity data to remove non-ASCII characters, white spaces, confidential data (e.g., personal information, health information), and/or the like. In this way, the behavioral analytics platform may organize thousands, millions, or billions of data entries for machine learning and model generation.

In some implementations, the behavioral analytics platform may perform a training operation when generating the data model based on the observed user behaviors represented in the historical user activity data. For example, the behavioral analytics platform may portion the historical user activity data into a training set (e.g., a set of data to train the data model), a validation set (e.g., a set of data used to evaluate a fit of the data model and/or to fine tune the data model), a test set (e.g., a set of data used to evaluate a final fit of the data model), and/or the like. In some implementations, the behavioral analytics platform may preprocess and/or perform dimensionality reduction to reduce the historical user activity data to a minimum feature set. In some implementations, the behavioral analytics platform may train the data model on this minimum feature set, thereby reducing processing to train the data model, and may apply a classification technique, to the minimum feature set.

In some implementations, the behavioral analytics platform may use a classification technique, such as a logistic regression classification technique, a random forest classification technique, a gradient boosting machine learning (GBM) technique, and/or the like, to determine a categorical outcome (e.g., that a particular behavior or behavior sequence is or is not associated with a particular behavioral category, sub-category, and/or the like). Additionally, or alternatively, the behavioral analytics platform may use a naive Bayesian classifier technique. In this case, the behavioral analytics platform may perform binary recursive partitioning to split the data of the minimum feature set into partitions and/or branches and use the partitions and/or branches to perform predictions (e.g., whether certain behavioral categories, sub-categories, and/or the like are similar, compatible, complementary, and/or the like). Based on using recursive partitioning, the behavioral analytics platform may reduce utilization of computing resources relative to manual, linear sorting and analysis of data points, thereby enabling use of thousands, millions, or billions of data points to train the data model, which may result in a more accurate data model than using fewer data points.

Additionally, or alternatively, the behavioral analytics platform may use a support vector machine (SVM) classifier technique to generate a non-linear boundary between data points in the training set. In this case, the non-linear boundary is used to classify test data (e.g., transactional data relating to human-to-human interactions, human-to-machine interactions, and/or the like) into a particular class.

Additionally, or alternatively, where the test data includes image data, video data, and/or the like (e.g., a photo or video that a user provides to the behavioral analytics platform), the behavioral analytics platform may use a computer vision technique, such as a convolutional neural network technique to assist in classifying test data (e.g., data relating to a user's appearance, data relating to certain locations or objects, and/or the like) into a particular class. In some cases, the computer vision technique may include using an image recognition technique (e.g., an Inception framework, a ResNet framework, a Visual Geometry Group (VGG) framework, and/or the like), an object detection technique (e.g. a Single Shot Detector (SSD) framework, a You Only Look Once (YOLO) framework, and/or the like), an object in motion technique (e.g., an optical flow framework and/or the like), and/or the like.

Additionally, or alternatively, the behavioral analytics platform may train the data model based on the observed user behaviors using a supervised training procedure that includes receiving input to the data model from a subject matter expert, which may reduce an amount of time, an amount of processing resources, and/or the like to train the data model based on the observed user behaviors relative to an unsupervised training procedure. In some implementations, the behavioral analytics platform may use one or more other model training techniques, such as a neural network technique, a latent semantic indexing technique, and/or the like. For example, the behavioral analytics platform may perform an artificial neural network processing technique (e.g., using a two-layer feedforward neural network architecture, a three-layer feedforward neural network architecture, and/or the like) to perform pattern recognition with regard to patterns among behaviors, behavior sequences, and/or the like that may be described using different semantic descriptions. In this case, using the artificial neural network processing technique may improve accuracy of the data model generated or otherwise obtained by the behavioral analytics platform by being more robust to noisy, imprecise, or incomplete data, and by enabling the behavioral analytics platform to detect patterns and/or trends undetectable to human analysts or systems using less complex techniques.

As an example, the behavioral analytics platform may use a supervised multi-label classification technique to train the data model. For example, as a first step, the behavioral analytics platform may map attributes associated with certain behavior vectors, behavior sequences, and/or the like to one or more behavioral categories, sub-categories, and/or the like. In this case, the attributes may be characterized as associated with one or more behavioral categories, sub-categories, and/or the like, or not associated with one or more behavioral categories, sub-categories, and/or the like based on characteristics of the attributes (e.g., whether an attribute is similar or otherwise associated with another attribute associated with a particular category, sub-category, and/or the like) and an analysis of the attributes (e.g., by a technician, thereby reducing processing relative to the behavioral analytics platform being required to analyze each activity). As a second step, the behavioral analytics platform may determine classifier chains, whereby labels of target variables may be correlated (e.g., in this example, labels may be behavioral categories, sub-categories, and/or the like and correlation may refer to behavioral categories, sub-categories, and/or the like that have one or more common, compatible, and/or complementary characteristics). In this case, the behavioral analytics platform may use an output of a first label as an input for a second label (as well as one or more input features), and may determine a likelihood that a particular user profile that is associated with a set of behavioral categories, sub-categories, and/or the like is similar, compatible, and/or complementary with respect to behavioral categories, sub-categories, and/or the like in which other user profiles are classified. In this way, the behavioral analytics platform transforms classification from a multilabel-classification problem to multiple single-classification problems, thereby reducing processing utilization. As a third step, the behavioral analytics platform may determine a Hamming Loss Metric relating to an accuracy of a label in performing a classification by using the validation set of the data. For example, the behavioral analytics platform may evaluate an accuracy with which a weighting applied to each behavioral category, sub-category, and/or the like results in a correct prediction of whether a given pair of user profiles is similar, compatible, complementary, and/or the like to account for differing amounts to which association of any one behavioral attribute, set of behavioral attributes, behavioral category, behavioral sub-category, and/or the like influences the prediction of whether a given pair of user profiles is similar, compatible, complementary, and/or the like. As a fourth step, the behavioral analytics platform may finalize the data model based on labels that satisfy a threshold accuracy associated with the Hamming Loss Metric and may use the data model to subsequently predict whether and/or a degree to which a pair of user profiles is similar, compatible, complementary, and/or the like.

As another example, the behavioral analytics platform may determine, using a linear regression technique, that a threshold percentage of behavioral attributes are likely to be dissimilar, incompatible, and/or the like, and may determine that those behavioral attributes are to receive relatively low association scores. In contrast, the behavioral analytics platform may determine that another threshold percentage of behavioral attributes are likely to be similar, compatible, complementary, and/or the like and may assign a relatively high association score to those behavioral attributes. Based on the characteristics of behavioral attributes that are likely to be similar, compatible, complementary, and/or the like, the behavioral analytics platform may generate the data model based on the observed user behaviors and may use the data model to analyze new user activity data obtained by the behavioral analytics platform.

Accordingly, the behavioral analytics platform may use a number of artificial intelligence techniques, machine learning techniques, deep learning techniques, and/or the like to classify user activity data (e.g., transactional data) into one or more behavioral categories, sub-categories, and/or the like and to predict affinities between user profiles associated with respective pairs of users based on the one or more behavioral categories, sub-categories, and/or the like in which the users are classified.

For example, as shown in FIG. 1B, and by reference number 115, the behavioral analytics platform may receive a match request from one or more user devices. In this case, the behavioral analytics platform may provide an online dating service and/or the like, and the match request may be in a context that relates to searching for potential romantic partners that the requesting user(s) may be interested in meeting. Accordingly, as described elsewhere herein, the user(s) associated with the user device(s) may have provided various personal details, preferences in a potential partner, responses to questionnaires, and/or the like during and/or after registering with the behavioral analytics platform.

As further shown in FIG. 1B, and by reference number 120, the behavioral analytics platform may identify, among a population of user profiles, a plurality of candidate user profiles that contain one or more attributes that match the personal details, preferences, questionnaire responses, and/or the like provided by the requesting user. For example, as described herein, the term "match" and variants thereof may refer to a first user profile containing one or more attributes or sets of attributes that are within a threshold difference of one or more attributes or sets of attributes in a second user profile. Accordingly, as shown in FIG. 1B, the behavioral analytics platform may identify a set of potential matches for a requesting user based on various attributes in the user profile associated with the requesting user and attributes in one or more other user profiles that are determined to be similar, compatible, complementary, and/or the like with respect to the requesting user. In this context, the attributes in the respective user profiles may include self-reported personal details, preferences in potential partners, questionnaire responses, and/or the like that users provide to the behavioral analytics platform.

As further shown in FIG. 1B, and by reference number 125, the behavioral analytics platform may filter and/or rank the potential matches based on whether the requesting user and the potential matches are classified in behavioral categories that are complementary, incompatible, similar, and/or the like. For example, the behavioral categories and/or sub-categories in which users are classified may be based on user activity data that relates to various transactions (e.g., financial transactions) in which the users participate. Accordingly, the behavioral categories and/or sub-categories may reflect the users' financial values, tendencies, personas, and/or the like, and the potential matches may be filtered and/or ranked based on an affinity among the one or more behavioral categories and/or sub-categories in which the users are classified (e.g., a first user classified as a frugal spender may be determined to be complementary with respect to a second user classified as a spendthrift because the frugal spender may offer valuable financial lessons to the spendthrift, even though the first user and the second user may have different intrinsic behavioral tendencies). In other examples, the affinity between the behavioral categories and/or sub-categories associated with different users may depend on respective strengths and weaknesses. The behavioral analytics platform may use one or more machine learning techniques as described elsewhere herein to filter and/or rank the potential matches based on how well the respective strengths and weaknesses do or do not align with one another, to what extent users classified in dissimilar categories and/or sub-categories are likely to be able to find a middle ground where a relationship can flourish, and/or the like.

In some implementations, the behavioral analytics platform may represent the affinity between the behavioral categories and/or sub-categories associated with different users according to a numeric value (e.g., in a particular range, such as from 0 to 100, where 0 is used to represent completely incompatible users and 100 is used to represent perfectly compatible users). In some cases, users may be classified in multiple different categories and/or sub-categories and a weight may be assigned to indicate a degree to which behavioral tendencies of the users align with particular categories and/or sub-categories. For example, a particular user may tend to spend money on leisure (e.g., music, restaurants, social activities, and/or the like) and also have a tendency to spend money on items that are likely to lead to an increase in future financial well-being (e.g., books on financial planning, educational seminars, and/or the like).

Accordingly, in reality, most users may have behavioral tendencies that are classified in a mix of different categories, sub-categories, and/or the like, and the behavioral analytics platform may use one or more machine learning techniques as described elsewhere herein to determine affinities between different user profiles according to the numeric values, weights, and/or the like used to represent the users' behavioral tendencies. For example, a potential match that is identified based on various attributes in the user profile associated with the requesting user and attributes in the user profile associated with the potential match may be filtered out if the affinity between the behavioral categories and/or sub-categories associated with the requesting user and the behavioral categories and/or sub-categories associated with the potential match fail to satisfy a threshold. Additionally, or alternatively, one or more potential matches may be included among matches that are presented to the requesting user if the affinity satisfies a threshold. Furthermore, where there are multiple potential matches that satisfy the threshold, the potential matches may be ranked based on the respective affinities between the behavioral categories and/or sub-categories associated with the requesting user and the behavioral categories and/or sub-categories associated with the potential matches.

As further shown in FIG. 1B, and by reference number 130, the behavioral analytics platform may provide, to the user devices, information related to one or more potential matches based on attributes in the respective user profiles (e.g., self-reported personal details, preferences in potential partners, questionnaire responses, and/or the like) and the affinity between the behavioral categories and/or sub-categories associated with the requesting user and the behavioral categories and/or sub-categories associated with the potential matches. For example, in some implementations, the behavioral analytics platform may populate one or more user interfaces that are accessible to the user devices to indicate details associated with the potential matches (e.g., a photograph, demographic details, hobbies, and/or the like) and to indicate behavioral categories and/or sub-categories of the potential matches that may be compatible or incompatible with respect to the requesting user. For example, the user interfaces may indicate that a particular match is highly ranked based solely on an analysis of the self-reported details, but transaction data associated with that user indicates certain behavioral tendencies that are likely to conflict or otherwise be incompatible with behavioral tendencies of the requesting user. In another example, the user interfaces may indicate that a particular match would have a low rank based solely on an analysis of the self-reported details, but transaction data associated with that user indicates certain behavioral tendencies that are likely to be compatible with behavioral tendencies of the requesting user.

In some implementations, in addition to using the transactional data contained in the user activity data to filter and/or rank potential matches, the behavioral analytics platform may use the transactional data contained in the user activity data to validate self-reported personal details, preferences, questionnaire responses, and/or the like. For example, if a user indicates that he/she loves to read and travel, but the transactional data contains few records of the user purchasing books, visiting libraries, conducting transactions in areas away from the user's home, and/or the like, the behavioral analytics platform may determine that the user has (intentionally or unintentionally) provided misleading or inaccurate self-reported information. In other examples, the transactional data may confirm self-reported information (e.g., where the transactional data includes substantial records of the user purchasing books, visiting libraries, purchasing airline tickets, conducting transactions in foreign countries, and/or the like). In some cases, the validity of self-reported information, as determined based on the transactional data, may be considered as an additional factor in determining the affinity between sets of behavioral categories and/or sub-categories associated with a particular pair of users.

Furthermore, in some implementations, the behavioral analytics platform may receive information from one or more user devices related to a relationship status with the potential matches that were provided by the behavioral analytics platform. For example, if a user is not interested in meeting a potential match, this information may be provided to the behavioral analytics platform and used to update various data models (e.g., decreasing a probability that another similar match will be returned in the future). In other examples, if users that communicate with one another meet one another in the real world, enter into a short-term or long-term relationship, and/or the like, the users may report this information to the behavioral analytics platform to enable the behavioral analytics platform to further update the data models to indicate whether certain behavioral categories, sub-categories, tendencies, and/or the like are complementary, compatible, incompatible, and/or the like.

In some implementations, as mentioned elsewhere herein, the behavioral analytics platform may additionally, or alternatively, perform a behavioral affinity assessment based on user activity data (e.g., transactional data) associated with a particular group of users (e.g., a married couple, an engaged couple, a couple in a relationship, a couple contemplating a relationship, individuals involved in and/or considering entering into a business relationship, and/or the like). For example, the behavioral affinity assessment may be used in a financial counseling setting, a therapeutic setting (e.g., marriage counseling, couple counseling, and/or the like), an information sharing setting, and/or the like.

For example, as shown in FIG. 1C, and by reference number 135, the behavioral analytics platform may receive a request to perform a behavioral affinity assessment associated with a particular group of users. In some implementations, the request may include information identifying each user in the group of users, which may allow the behavioral analytics platform to obtain appropriate user activity data (e.g., transactional data) associated with each user in the group of users (e.g., from user devices associated with the users, one or more behavioral data provider devices that have available transactional data and/or other user activity data associated with the users, and/or the like).

As further shown in FIG. 1C, and by reference number 140, the behavioral analytics platform may evaluate an affinity among the user profiles associated with the group of users based on various behavioral categories, sub-categories, and/or the like in which the respective users are classified. For example, as described elsewhere herein, the behavioral analytics platform may extract one or more behavioral attributes from transactional data and/or other user activity data associated with the respective users and derive one or more behavior vectors, behavior sequences that link or otherwise associate multiple behavior vectors, and/or the like based on the behavioral attributes extracted from the transactional data and/or other user activity data. In some implementations, the behavioral analytics platform may input or otherwise provide the behavior vectors, behavior sequences, and/or the like to a data model (e.g., a machine learning model), which may output information indicating one or more behavioral categories, sub-categories, and/or the like in which the users are classified based on the behavior vectors, behavior sequences, and/or the like associated with the respective users. For example, in some cases, a given user may have behavioral tendencies that fall into multiple categories, sub-categories, and/or the like, and the information output by the data model may indicate a degree to which the behavioral tendencies for each respective user align with various behavioral categories, sub-categories, and/or the like.

In some implementations, for each respective user, the behavioral tendencies may indicate one or more core values that the user has with respect to financial matters, spending habits of the user, saving habits of the user, investment habits of the user, and/or the like. Accordingly, in some implementations, the affinity between the behavioral categories, sub-categories, and/or the like associated with the users in the group of users may indicate how the core financial values for the users align and/or conflict, commonalities among the behavioral tendencies associated with the users, strengths and/or weaknesses for each user, and/or the like. Furthermore, in some implementations, the behavioral affinity assessment may include information that relates to behavioral tendencies associated with each individual user, behavioral tendencies associated with the group of users collectively, and/or the like. For example, in the case of a married couple, an engaged couple, a couple in a relationship, and/or the like, the behavioral affinity assessment may include information that relates to how each individual tends to behave with respect to financial matters and information that relates to how the couple tends to collectively behave with respect to financial matters.

As further shown in FIG. 1C, and by reference number 145, the behavioral analytics platform may populate one or more user interfaces that are accessible to the user devices associated with the users in the group of users. In particular, the one or more user interfaces may be populated to include information related to the behavioral affinity assessment, as described in further detail elsewhere herein. As further shown in FIG. 1C, and by reference number 150, the behavioral analytics platform may provide the user devices with access to the behavioral affinity assessment. For example, the user devices provided with access to the behavioral affinity assessment may belong to the users in the group of users and/or specific users that the users in the group of users have granted authorization to view the behavioral affinity assessment (e.g., a financial counselor, a marriage counselor, and/or the like).

As indicated above, FIGS. 1A-1C are provided as one or more examples. Other examples may differ from what is described with regard to FIGS. 1A-1C.

Figure 2:
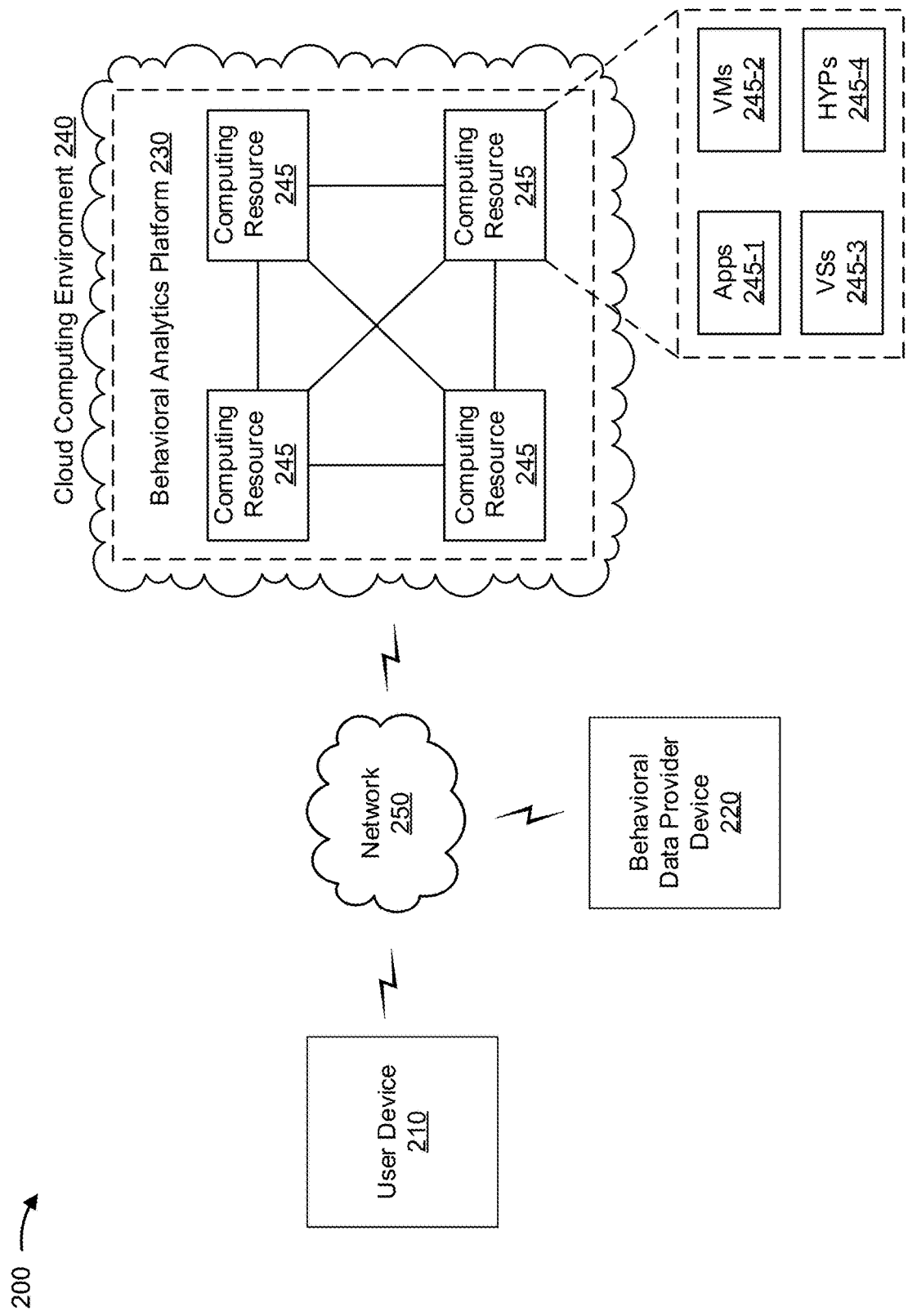
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a behavioral data provider device 220, a behavioral analytics platform 230 in a cloud computing environment 240 that includes a set of one or more computing resources 245, and a network 250. Devices of environment 200 may interconnect via wired connections, wireless connections, or a combination of wired and wireless connections.

User device 210 includes one or more devices capable of receiving, generating, storing, processing, and/or providing information associated with predicting affinities between user profiles based on behavioral data analytics. For example, user device 210 may include a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device.

In some implementations, user device 210 may provide user activity data (e.g., transactional data) to behavioral analytics platform 230 and access one or more user interfaces that behavioral analytics platform 230 populates to indicate one or more potential matches for a user of user device 210 (e.g., other users with similar and/or complementary profiles) based on behavioral categories in which the user and the one or more potential matches are classified. Additionally, or alternatively, user device 210 may request that behavioral analytics platform 230 perform a behavioral affinity assessment based on user activity data (e.g., transactional data) associated with the user of user device 210 and another specific user (e.g., another user to whom the user of user device 210 is married, engaged, in a relationship with, and/or the like). For example, the behavioral affinity assessment may be requested for use in a counseling setting, a therapeutic setting, an information sharing setting, and/or the like.

Behavioral data provider device 220 includes one or more devices capable of receiving, generating, storing, processing, and/or providing information associated with predicting affinities between user profiles based on behavioral data analytics. For example, behavioral data provider device 220 may be a physical device implemented within a housing, such as a chassis, a virtual device implemented by one or more computer devices of a cloud computing environment or a data center, and/or the like. In some implementations, behavioral data provider device 220 may provide user activity data (e.g., transactional data associated with the user of user device 210) to behavioral analytics platform 230, and behavioral analytics platform 230 may use the user activity data to classify the user of user device 210 into one or more behavioral categories, sub-categories, and/or the like. Accordingly, in some implementations, behavioral analytics platform 230 may use the user activity data provided by behavioral data provider device 220 to identify one or more potential matches for the user of user device 210, perform a behavioral affinity assessment with respect to the user of user device 210 and another specific user, and/or the like.

Behavioral analytics platform 230 includes one or more devices capable of receiving, generating, storing, processing, and/or providing information associated with predicting affinities between user profiles based on behavioral data analytics. For example, as described elsewhere herein, behavioral analytics platform 230 may receive user activity data (e.g., transactional data) from user device 210 and/or behavioral data provider device 220, classify a user associated with user device 210 into one or more behavioral categories based on the user activity data, and identify one or more potential matches for the user of user device 210 (e.g., other users with similar and/or complementary profiles) based on the behavioral categories in which the user and the one or more potential matches are classified. Additionally, or alternatively, behavioral analytics platform 230 may be configured to perform a behavioral affinity assessment based on user activity data (e.g., transactional data) associated with a particular group of users (e.g., a married couple, an engaged couple, a couple in a relationship, a couple contemplating a relationship, individuals involved in and/or considering entering into a business relationship, and/or the like). For example, the behavioral affinity assessment could be used in a financial counseling setting, a therapeutic setting, an information sharing setting, and/or the like.

In some implementations, as shown, behavioral analytics platform 230 can be hosted in a cloud computing environment 240. Notably, while implementations described herein describe behavioral analytics platform 230 as being hosted in cloud computing environment 240, in some implementations, behavioral analytics platform 230 can be non-cloud-based (e.g., can be implemented outside of a cloud computing environment) or partially cloud-based.

Cloud computing environment 240 includes an environment that hosts behavioral analytics platform 230. Cloud computing environment 240 can provide computation services, software services, data access services, storage services, and/or other services that do not require end-user knowledge of a physical location and configuration of system(s) and/or device(s) that host behavioral analytics platform 230. As shown, cloud computing environment 240 can include a set of one or more computing resources 245 (referred to collectively as "computing resources 245" and individually as "computing resource 245").

Computing resource 245 includes one or more personal computers, workstation computers, server devices, or other types of computation and/or communication devices. In some implementations, computing resource 245 can host behavioral analytics platform 230. The cloud resources can include compute instances executing in computing resource 245, storage devices provided in computing resource 245, data transfer devices provided by computing resource 245, and/or the like. In some implementations, computing resource 245 can communicate with other computing resources 245 via wired connections, wireless connections, or a combination of wired and wireless connections.

As further shown in FIG. 2, computing resource 245 includes a group of cloud resources, such as one or more applications ("APPs") 245-1, one or more virtual machines ("VMs") 245-2, virtualized storage ("VSs") 245-3, one or more hypervisors ("HYPs") 245-4, and/or the like.

Application 245-1 includes one or more software applications that can be provided to or accessed by user device 210, behavioral data provider device 220, and/or the like. Application 245-1 can eliminate a need to install and execute the software applications on user device 210, behavioral data provider device 220, and/or the like. For example, application 245-1 can include software associated with behavioral analytics platform 230 and/or any other software capable of being provided via cloud computing environment 240. In some implementations, one application 245-1 can send information to and/or receive information from one or more other applications 245-1, via virtual machine 245-2.

Virtual machine 245-2 includes a software implementation of a machine (e.g., a computer) that executes programs like a physical machine. Virtual machine 245-2 can be either a system virtual machine or a process virtual machine, depending upon use and degree of correspondence to any real machine by virtual machine 245-2. A system virtual machine can provide a complete system platform that supports execution of a complete operating system ("OS"). A process virtual machine can execute a single program, and can support a single process. In some implementations, virtual machine 245-2 can execute on behalf of a user (e.g., a user of user device 210, behavioral data provider device 220, and/or the like), and can manage infrastructure of cloud computing environment 240, such as data management, synchronization, or long-duration data transfers.

Virtualized storage 245-3 includes one or more storage systems and/or one or more devices that use virtualization techniques within the storage systems or devices of computing resource 245. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can provide administrators of the storage system with flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 245-4 can provide hardware virtualization techniques that allow multiple operating systems (e.g., "guest operating systems") to execute concurrently on a host computer, such as computing resource 245. Hypervisor 245-4 can present a virtual operating platform to the guest operating systems, and can manage the execution of the guest operating systems. Multiple instances of a variety of operating systems can share virtualized hardware resources.

Network 250 includes one or more wired and/or wireless networks. For example, network 250 can include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, a core network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
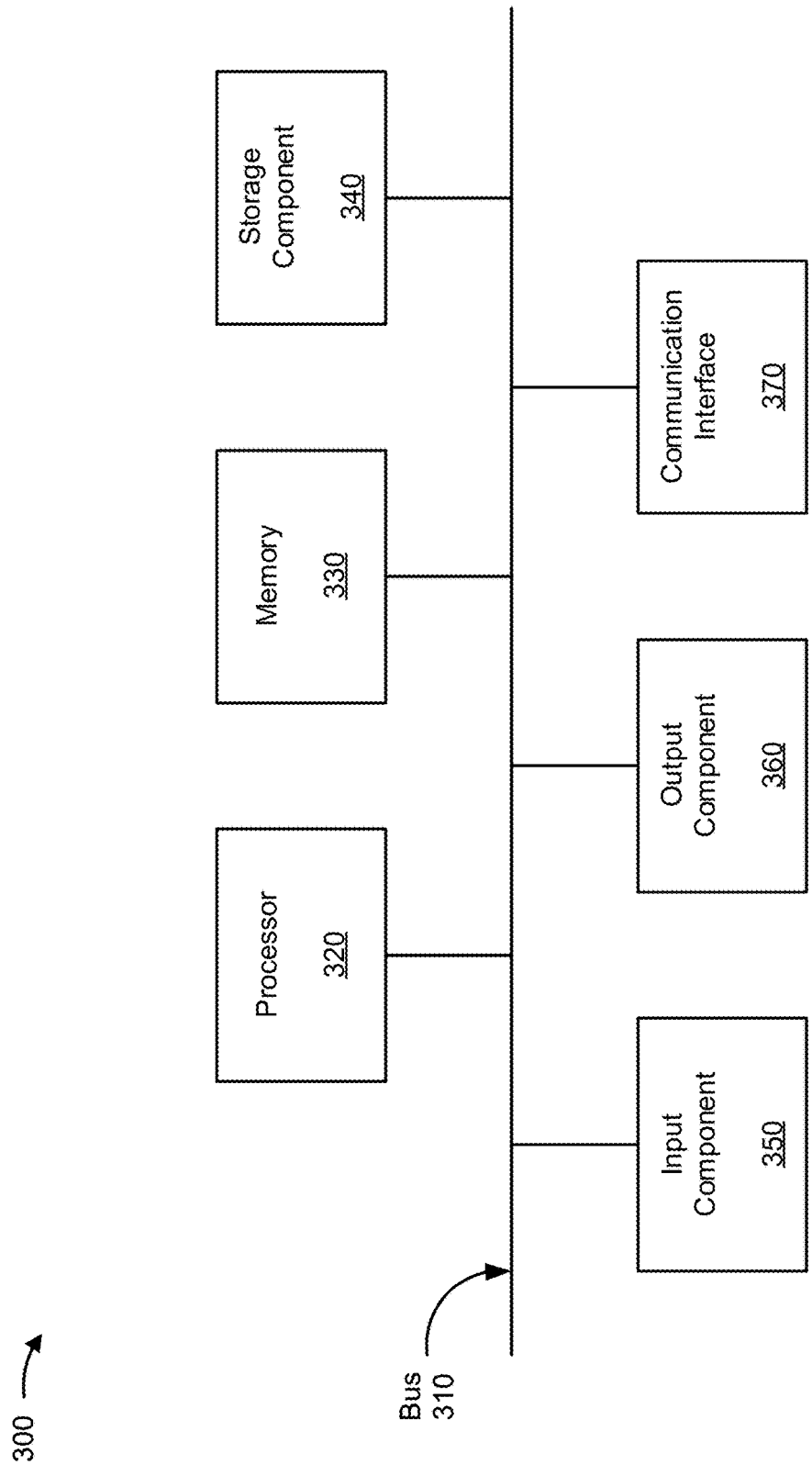
FIG. 3 is a diagram of example components of one or more devices of FIG. 2.

FIG. 3 is a diagram of example components of a device 300. Device 300 may correspond to user device 210, behavioral data provider device 220, behavioral analytics platform 230, and/or the like. In some implementations, user device 210, behavioral data provider device 220, and/or behavioral analytics platform 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for predicting user profile affinity based on behavioral data analytics. In some implementations, one or more process blocks of FIG. 4 may be performed by a behavioral analytics platform (e.g., behavioral analytics platform 230). In some implementations, one or more process blocks of FIG. 4 may be performed by another device or a group of devices separate from or including the behavioral analytics platform, such as a user device (e.g., user device 210), a behavioral data provider device (e.g., behavioral data provider device 220), and/or the like.

As shown in FIG. 4, process 400 may include obtaining a data model trained to classify historical user activity data using a machine learning technique (block 410). For example, the behavioral analytics platform (e.g., using computing resource 245, processor 320, memory 330, storage component 340, input component 350, output component 360, communication interface 370, and/or the like) may obtain a data model trained to classify historical user activity data using a machine learning technique, as described above.

As further shown in FIG. 4, process 400 may include obtaining a first data set associated with a first user and a second data set associated with a second user, wherein the first data set includes a first set of behavior vectors based on historical user activity data in a first user profile associated with the first user, and wherein the second data set includes a second set of behavior vectors based on historical user activity data in a second user profile associated with the second user (block 420). For example, the behavioral analytics platform (e.g., using computing resource 245, processor 320, memory 330, storage component 340, input component 350, output component 360, communication interface 370, and/or the like) may obtain a first data set associated with a first user and a second data set associated with a second user, as described above. In some implementations, the first data set includes a first set of behavior vectors based on historical user activity data in a first user profile associated with the first user. In some implementations, the second data set includes a second set of behavior vectors based on historical user activity data in a second user profile associated with the second user.

As further shown in FIG. 4, process 400 may include providing the first data set and the second data set to the data model, wherein the data model uses the machine learning technique to output a first set of behavioral categories to classify the historical user activity data associated with the first user and a second set of behavioral categories to classify the historical user activity data associated with the second user (block 430). For example, the behavioral analytics platform (e.g., using computing resource 245, processor 320, memory 330, storage component 340, input component 350, output component 360, communication interface 370, and/or the like) may provide the first data set and the second data set to the data model, as described above. In some implementations, the data model uses the machine learning technique to output a first set of behavioral categories to classify the historical user activity data associated with the first user and a second set of behavioral categories to classify the historical user activity data associated with the second user.

As further shown in FIG. 4, process 400 may include determining an affinity between the first set of behavioral categories and the second set of behavioral categories using the machine learning technique (block 440). For example, the behavioral analytics platform (e.g., using computing resource 245, processor 320, memory 330, storage component 340, input component 350, output component 360, communication interface 370, and/or the like) may determine an affinity between the first set of behavioral categories and the second set of behavioral categories using the machine learning technique, as described above.

As further shown in FIG. 4, process 400 may include populating one or more user interfaces that are accessible to one or more of the first user or the second user based on the affinity between the first set of behavioral categories and the second set of behavioral categories (block 450). For example, the behavioral analytics platform (e.g., using computing resource 245, processor 320, memory 330, storage component 340, input component 350, output component 360, communication interface 370, and/or the like) may populate one or more user interfaces that are accessible to one or more of the first user or the second user based on the affinity between the first set of behavioral categories and the second set of behavioral categories, as described above.

Process 400 may include additional implementations, such as any single implementation or any combination of implementations described below and/or in connection with one or more other processes described elsewhere herein.

In some implementations, the one or more user interfaces are populated to indicate one or more of the first set of behavioral categories that are compatible or incompatible with respect to one or more of the second set of behavioral categories.

In some implementations, the behavioral analytics platform may receive a request to identify one or more matches for the first user profile and include the second user profile among the one or more matches for the first user profile based on the second user profile containing one or more attributes that match preference data contained in the first user profile and based on the affinity between the first set of behavioral categories and the second set of behavioral categories satisfying a threshold. In some implementations, the one or more user interfaces may be populated to include information related to the one or more matches for the first user profile.

In some implementations, the behavioral analytics platform may identify, among a population of user profiles, a plurality of candidate user profiles containing one or more attributes that match the preference data contained in the first user profile. In some implementations, the one or more user interfaces may be further populated to indicate, among the plurality of candidate user profiles, a ranking for the second user profile based on the affinity between the first set of behavioral categories and the second set of behavioral categories.

In some implementations, the behavioral analytics platform may receive information related to a relationship status between the first user and the second user and use the machine learning technique to update the data model based on the information related to the relationship status between the first user and the second user.

In some implementations, the first user profile and the second user profile may include one or more attributes that characterize respective behavioral tendencies for the first user and the second user based on response data received from the first user and the second user. In some implementations, the behavioral analytics platform may determine a validity of the response data received from the first user based on the first set of behavioral categories and determine a validity of the response data received from the second user based on the second set of behavioral categories.

In some implementations, the affinity between the first set of behavioral categories and the second set of behavioral categories may be based on a first value representing the validity of the response data received from the first user and a second value representing the validity of the response data received from the second user.

In some implementations, the historical user activity data in the first user profile and the historical user activity data in the second user profile may include data related to historical financial behaviors, and the historical financial behaviors may relate to one or more of spending patterns, savings patterns, investment patterns, or debt repayment patterns.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for predicting user profile affinity based on behavioral data analytics. In some implementations, one or more process blocks of FIG. 5 may be performed by a behavioral analytics platform (e.g., behavioral analytics platform 230). In some implementations, one or more process blocks of FIG. 5 may be performed by another device or a group of devices separate from or including the behavioral analytics platform, such as a user device (e.g., user device 210), a behavioral data provider device (e.g., behavioral data provider device 220), and/or the like.

As shown in FIG. 5, process 500 may include obtaining a first data set associated with a first user and a second data set associated with a second user, wherein the first data set includes a first set of behavior vectors based on historical user activity data in a first user profile associated with the first user, and wherein the second data set includes a second set of behavior vectors based on historical user activity data in a second user profile associated with the second user (block 510). For example, the behavioral analytics platform (e.g., using computing resource 245, processor 320, memory 330, storage component 340, input component 350, output component 360, communication interface 370, and/or the like) may obtain a first data set associated with a first user and a second data set associated with a second user, as described above. In some implementations, the first data set includes a first set of behavior vectors based on historical user activity data in a first user profile associated with the first user. In some implementations, the second data set includes a second set of behavior vectors based on historical user activity data in a second user profile associated with the second user.

As further shown in FIG. 5, process 500 may include determining a first set of behavioral categories to classify the historical user activity data associated with the first user based on the first set of behavior vectors (block 520). For example, the behavioral analytics platform (e.g., using computing resource 245, processor 320, memory 330, storage component 340, input component 350, output component 360, communication interface 370, and/or the like) may determine a first set of behavioral categories to classify the historical user activity data associated with the first user based on the first set of behavior vectors, as described above.

As further shown in FIG. 5, process 500 may include determining a second set of behavioral categories to classify the historical user activity data associated with the second user based on the second set of behavior vectors (block 530). For example, the behavioral analytics platform (e.g., using computing resource 245, processor 320, memory 330, storage component 340, input component 350, output component 360, communication interface 370, and/or the like) may determine a second set of behavioral categories to classify the historical user activity data associated with the second user based on the second set of behavior vectors, as described above.

As further shown in FIG. 5, process 500 may include populating one or more user interfaces that are accessible to one or more of the first user or the second user based on one or more values representing a degree to which the first set of behavioral categories and the second set of behavioral categories correspond to complementary behavioral tendencies, wherein the degree to which the first set of behavioral categories and the second set of behavioral categories correspond to complementary behavioral tendencies is determined using a machine learning technique (block 540). For example, the behavioral analytics platform (e.g., using computing resource 245, processor 320, memory 330, storage component 340, input component 350, output component 360, communication interface 370, and/or the like) may populate one or more user interfaces that are accessible to one or more of the first user or the second user based on one or more values representing a degree to which the first set of behavioral categories and the second set of behavioral categories correspond to complementary behavioral tendencies, as described above. In some implementations, the degree to which the first set of behavioral categories and the second set of behavioral categories correspond to complementary behavioral tendencies is determined using a machine learning technique.

Process 500 may include additional implementations, such as any single implementation or any combination of implementations described below and/or in connection with one or more other processes described elsewhere herein.

In some implementations, the behavioral analytics platform may receive a request to identify one or more matches for the first user profile and determine whether to include the second user profile among the one or more matches for the first user profile based on whether the one or more values satisfy a threshold.

In some implementations, the behavioral analytics platform may identify, among a population of user profiles, a plurality of candidate user profiles containing one or more attributes that match preference data contained in the first user profile. In some implementations, the one or more user interfaces may be populated to indicate, among the plurality of candidate user profiles, a ranking for the second user profile based on the degree to which the first set of behavioral categories and the second set of behavioral categories correspond to complementary behavioral tendencies.

In some implementations, the first user profile and the second user profile may include one or more attributes that characterize respective behavioral tendencies for the first user and the second user based on response data received from the first user and the second user. In some implementations, the behavioral analytics platform may determine a validity of the response data received from the first user based on the first set of behavioral categories and determine a validity of the response data received from the second user based on the second set of behavioral categories. In some implementations, the one or more values representing the degree to which the first set of behavioral categories and the second set of behavioral categories correspond to complementary behavioral tendencies may be based at least in part on the validity of the response data received from the first user and the validity of the response data received from the second user.

In some implementations, one or more behavior vectors in the first set of behavior vectors and one or more behavior vectors in the second set of behavior vectors may include one or more of an object, an operation, an interaction, or a property associated with a feature that represents an observed user behavior.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for predicting user profile affinity based on behavioral data analytics. In some implementations, one or more process blocks of FIG. 6 may be performed by a behavioral analytics platform (e.g., behavioral analytics platform 230). In some implementations, one or more process blocks of FIG. 6 may be performed by another device or a group of devices separate from or including the behavioral analytics platform, such as a user device (e.g., user device 210), a behavioral data provider device (e.g., behavioral data provider device 220), and/or the like.

As shown in FIG. 6, process 600 may include obtaining, from a storage device, historical user activity data contained in a first user profile and historical user activity data contained in a second user profile (block 610). For example, the behavioral analytics platform (e.g., using computing resource 245, processor 320, memory 330, storage component 340, input component 350, output component 360, communication interface 370, and/or the like) may obtain, from a storage device, historical user activity data contained in a first user profile and historical user activity data contained in a second user profile, as described above.

As further shown in FIG. 6, process 600 may include deriving a first set of behavior vectors based on the historical user activity data contained in the first user profile (block 620). For example, the behavioral analytics platform (e.g., using computing resource 245, processor 320, memory 330, storage component 340, input component 350, output component 360, communication interface 370, and/or the like) may derive a first set of behavior vectors based on the historical user activity data contained in the first user profile, as described above.

As further shown in FIG. 6, process 600 may include deriving a second set of behavior vectors based on the historical user activity data contained in the second user profile (block 630). For example, the behavioral analytics platform (e.g., using computing resource 245, processor 320, memory 330, storage component 340, input component 350, output component 360, communication interface 370, and/or the like) may derive a second set of behavior vectors based on the historical user activity data contained in the second user profile, as described above.

As further shown in FIG. 6, process 600 may include determining, using a machine learning technique, a first set of behavioral categories to classify the first set of behavior vectors and a second set of behavioral categories to classify the second set of behavior vectors (block 640). For example, the behavioral analytics platform (e.g., using computing resource 245, processor 320, memory 330, storage component 340, input component 350, output component 360, communication interface 370, and/or the like) may determine, using a machine learning technique, a first set of behavioral categories to classify the first set of behavior vectors and a second set of behavioral categories to classify the second set of behavior vectors, as described above.

As further shown in FIG. 6, process 600 may include determining, using the machine learning technique, an affinity between the first set of behavioral categories and the second set of behavioral categories (block 650). For example, the behavioral analytics platform (e.g., using computing resource 245, processor 320, memory 330, storage component 340, input component 350, output component 360, communication interface 370, and/or the like) may determine, using the machine learning technique, an affinity between the first set of behavioral categories and the second set of behavioral categories, as described above.

As further shown in FIG. 6, process 600 may include populating one or more user interfaces to include information related to the affinity between the first set of behavioral categories and the second set of behavioral categories (block 660). For example, the behavioral analytics platform (e.g., using computing resource 245, processor 320, memory 330, storage component 340, input component 350, output component 360, communication interface 370, and/or the like) may populate one or more user interfaces to include information related to the affinity between the first set of behavioral categories and the second set of behavioral categories, as described above.

Process 600 may include additional implementations, such as any single implementation or any combination of implementations described below and/or in connection with one or more other processes described elsewhere herein.

In some implementations, the behavioral analytics platform may receive a request to identify one or more matches for the first user profile and include the second user profile among the one or more matches for the first user profile based on the affinity between the first set of behavioral categories and the second set of behavioral categories satisfying a threshold. In some implementations, the one or more user interfaces may be populated to include information related to the one or more matches for the first user profile.

In some implementations, the behavioral analytics platform may identify, among a population of user profiles, a plurality of candidate user profiles containing one or more attributes that match preference data contained in the first user profile. In some implementations, the one or more user interfaces may be further populated to indicate, among the plurality of candidate user profiles, a ranking for the second user profile based on the affinity between the first set of behavioral categories and the second set of behavioral categories. In some implementations, the one or more user interfaces may be populated to indicate one or more of the first set of behavioral categories that are compatible or incompatible with respect to one or more of the second set of behavioral categories.

In some implementations, the first user profile and the second user profile may include one or more attributes that characterize respective behavioral tendencies associated with the first user profile and the second user profile. In some implementations, the behavioral analytics platform may validate response data received from a first user associated with the first user profile based on the first set of behavioral categories and validate response data received from a second user associated with the second user profile based on the second set of behavioral categories.

In some implementations, one or more behavior vectors in the first set of behavior vectors and one or more behavior vectors in the second set of behavior vectors may include one or more of an object, an operation, an interaction, or a property associated with a feature that represents an observed user behavior.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, and/or the like). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   obtaining, at a device, a data model trained to classify historical user activity data using a machine learning technique,
       the historical user activity data being reduced into a minimum feature set,
           the data model being trained based on the minimum feature set, and
       the historical user activity data being portioned into:
           a training set to train the data model,
           a validation set to evaluate a fit of the data model and/or to fine tune the data model, and
           a test set to evaluate a final fit of the data model;
   obtaining, at the device, a first data set associated with a first user and a second data set associated with a second user,
       wherein the first data set includes a first set of behavior vectors based on historical user activity data in a first user profile associated with the first user,
       wherein the second data set includes a second set of behavior vectors based on historical user activity data in a second user profile associated with the second user; providing, by the device, the first data set and the second data set to the data model,
       wherein the data model uses the machine learning technique to output:
           a first set of behavioral categories to classify the historical user activity data associated with the first user, and
           a second set of behavioral categories to classify the historical user activity data associated with the second user;
   determining, by the device, an affinity between the first set of behavioral categories and the second set of behavioral categories using the machine learning technique;
   receiving, by the device, response data associated with the first user,
       the response data associated with the first user being based on self-reported personal details;
   receiving, by the device, response data associated with the second user,
       the response data associated with the second user being based on self-reported personal details; and
   populating, by the device, one or more user interfaces that are accessible to one or more of the first user or the second user based on the affinity between the first set of behavioral categories and the second set of behavioral categories,
       wherein the one or more user interfaces are populated to indicate:
           one or more of the first set of behavioral categories that are compatible with respect to one or more of the second set of behavioral categories based on the affinity between the first set of behavioral categories and the second set of behavioral categories, and
           one or more of the first set of behavioral categories that are incompatible with respect to one or more of the second set of behavioral categories based on an analysis of the response data associated with the first user and the response data associated with the second user.

2. The method of claim 1, further comprising:
   receiving a request to identify one or more matches for the first user profile; and
   including the second user profile among the one or more matches for the first user profile based on the second user profile containing one or more attributes that match preference data contained in the first user profile and based on the affinity between the first set of behavioral categories and the second set of behavioral categories satisfying a threshold,
   wherein the one or more user interfaces are populated to include information related to the one or more matches for the first user profile.

3. The method of claim 2, further comprising:
identifying, among a population of user profiles, a plurality of candidate user profiles containing one or more attributes that match the preference data contained in the first user profile,
   wherein the one or more user interfaces are further populated to indicate, among the plurality of candidate user profiles, a ranking for the second user profile based on the affinity between the first set of behavioral categories and the second set of behavioral categories.

4. The method of claim 2, further comprising:
receiving information related to a relationship status between the first user and the second user; and
using the machine learning technique to update the data model based on the information related to the relationship status between the first user and the second user.

5. The method of claim 1, wherein:
the first user profile and the second user profile include one or more attributes that characterize respective behavioral tendencies for the first user and the second user based on response data received from the first user and the second user, and
the method further comprises:
   determining a validity of the response data received from the first user based on the first set of behavioral categories; and
   determining a validity of the response data received from the second user based on the second set of behavioral categories.

6. The method of claim 5, wherein the affinity between the first set of behavioral categories and the second set of behavioral categories is based on a first value representing the validity of the response data received from the first user and a second value representing the validity of the response data received from the second user.

7. The method of claim 1, wherein:
the historical user activity data in the first user profile and the historical user activity data in the second user profile include data related to historical financial behaviors, and
the historical financial behaviors relate to one or more of spending patterns, savings patterns, investment patterns, or debt repayment patterns.

8. The method of claim 1, further comprising:
using a scoring system to identify and/or classify the first user and the second user as being associated with one or more behavioral categories.

9. A device, comprising:
one or more memories; and
one or more processors communicatively coupled to the one or more memories, configured to:
   obtain a data model trained to classify historical user activity data using a machine learning technique,
      the historical user activity data being reduced into a minimum feature set,
      the data model being trained based on the minimum feature set, and
      the historical user activity data being portioned into:
         a training set to train the data model,
         a validation set to evaluate a fit of the data model and/or to fine tune the data model, and
         a test set to evaluate a final fit of the data model;
   obtain a first data set associated with a first user and a second data set associated with a second user,
      wherein the first data set includes a first set of behavior vectors based on historical user activity data in a first user profile associated with the first user, and
      wherein the second data set includes a second set of behavior vectors based on historical user activity data in a second user profile associated with the second user;
   determine a first set of behavioral categories to classify the historical user activity data associated with the first user based on the first set of behavior vectors;
   determine a second set of behavioral categories to classify the historical user activity data associated with the second user based on the second set of behavior vectors;
   receive response data associated with the first user, the response data associated with the first user being based on self-reported personal details;
   receive response data associated with the second user, the response data associated with the second user being based on self-reported personal details; and
   populate one or more user interfaces that are accessible to one or more of the first user or the second user based on one or more values representing a degree to which the first set of behavioral categories and the second set of behavioral categories correspond to complementary behavioral tendencies,
      wherein the one or more user interfaces are populated to indicate:
         one or more of the first set of behavioral categories that are compatible with respect to one or more of the second set of behavioral categories based on an affinity between the first set of behavioral categories and the second set of behavioral categories, and
         one or more of the first set of behavioral categories that are incompatible with respect to one or more of the second set of behavioral categories based on an analysis of the response data associated with the first user and the response data associated with the second user, and
      wherein the degree to which the first set of behavioral categories and the second set of behavioral categories correspond to complementary behavioral tendencies is determined using the machine learning technique.

10. The device of claim 9, wherein the one or more processors are further configured to:
receive a request to identify one or more matches for the first user profile; and
determine whether to include the second user profile among the one or more matches for the first user profile based on whether the one or more values satisfy a threshold.

11. The device of claim 9, wherein the one or more processors are further configured to:
identify, among a population of user profiles, a plurality of candidate user profiles containing one or more attributes that match preference data contained in the first user profile,
   wherein the one or more user interfaces are populated to indicate, among the plurality of candidate user profiles, a ranking for the second user profile based on the degree to which the first set of behavioral categories and the second set of behavioral categories correspond to complementary behavioral tendencies.

12. The device of claim 9, wherein:
the first user profile and the second user profile include one or more attributes that characterize respective behavioral tendencies for the first user and the second user based on response data received from the first user and the second user, and
the one or more processors are further configured to:
determine a validity of the response data received from the first user based on the first set of behavioral categories; and
determine a validity of the response data received from the second user based on the second set of behavioral categories.

13. The device of claim 12, wherein the one or more values representing the degree to which the first set of behavioral categories and the second set of behavioral categories correspond to complementary behavioral tendencies are based at least in part on the validity of the response data received from the first user and the validity of the response data received from the second user.

14. The device of claim 9, wherein one or more behavior vectors in the first set of behavior vectors and one or more behavior vectors in the second set of behavior vectors include one or more of an object, an operation, an interaction, or a property associated with a feature that represents an observed user behavior.

15. A non-transitory computer-readable medium storing instructions, the instructions comprising:
one or more instructions that, when executed by one or more processors, cause the one or more processors to:
obtain a data model trained to classify historical user activity data using a machine learning technique,
the historical user activity data being reduced into a minimum feature set,
the data model being trained based on the minimum feature set, and
the historical user activity data being portioned into:
a training set to train the data model,
a validation set to evaluate a fit of the data model and/or to fine tune the data model, and
a test set to evaluate a final fit of the data model;
obtain, from a storage device, historical user activity data contained in a first user profile and historical user activity data contained in a second user profile;
derive a first set of behavior vectors based on the historical user activity data contained in the first user profile;
derive a second set of behavior vectors based on the historical user activity data contained in the second user profile;
determine, using the machine learning technique, a first set of behavioral categories to classify the first set of behavior vectors and a second set of behavioral categories to classify the second set of behavior vectors;
determine, using the machine learning technique, an affinity between the first set of behavioral categories and the second set of behavioral categories; and
receive response data associated with a first user,
the response data associated with the first user being based on self-reported personal details;
receiving response data associated with a second user,
the response data associated with the second user being based on self-reported personal details; and
populate one or more user interfaces to include information related to the affinity between the first set of behavioral categories and the second set of behavioral categories,
wherein the one or more user interfaces are populated to indicate:
one or more of the first set of behavioral categories that are compatible with respect to one or more of the second set of behavioral categories based on the affinity between the first set of behavioral categories and the second set of behavioral categories, and
one or more of the first set of behavioral categories that are incompatible with respect to one or more of the second set of behavioral categories based on an analysis of the response data associated with the first user and the response data associated with the second user.

16. The non-transitory computer-readable medium of claim 15, wherein the one or more instructions, when executed by the one or more processors, further cause the one or more processors to:
receive a request to identify one or more matches for the first user profile; and
include the second user profile among the one or more matches for the first user profile based on the affinity between the first set of behavioral categories and the second set of behavioral categories satisfying a threshold,
wherein the one or more user interfaces are populated to include information related to the one or more matches for the first user profile.

17. The non-transitory computer-readable medium of claim 16, wherein the one or more instructions, when executed by the one or more processors, further cause the one or more processors to:
identify, among a population of user profiles, a plurality of candidate user profiles containing one or more attributes that match preference data contained in the first user profile,
wherein the one or more user interfaces are further populated to indicate, among the plurality of candidate user profiles, a ranking for the second user profile based on the affinity between the first set of behavioral categories and the second set of behavioral categories.

18. The non-transitory computer-readable medium of claim 15, wherein:
the first user profile and the second user profile include one or more attributes that characterize respective behavioral tendencies associated with the first user profile and the second user profile, and
the one or more instructions, when executed by the one or more processors, further cause the one or more processors to:
validate response data received from a first user associated with the first user profile based on the first set of behavioral categories; and
validate response data received from a second user associated with the second user profile based on the second set of behavioral categories.

19. The non-transitory computer-readable medium of claim 15, wherein one or more behavior vectors in the first set of behavior vectors and one or more behavior vectors in the second set of behavior vectors include one or more of an object, an operation, an interaction, or a property associated with a feature that represents an observed user behavior.

20. The non-transitory computer-readable medium of claim 15, wherein the one or more instructions, when executed by the one or more processors, further cause the one or more processors to:
   use a scoring system to identify and/or classify the first user and the second user as being associated with one or more behavioral categories.

\* \* \* \* \*